(12) United States Patent
Asahi

(10) Patent No.: US 6,619,867 B1
(45) Date of Patent: Sep. 16, 2003

(54) OPTICAL TRANSMISSION SYSTEM

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 09/580,128

(22) Filed: May 30, 2000

(30) Foreign Application Priority Data

Jun. 2, 1999  (JP) .......................................... 11-154549

(51) Int. Cl.$^7$ ............................................. H04B 10/00
(52) U.S. Cl. ........................ 398/154; 398/30; 398/47; 398/53; 398/79; 398/102; 398/161
(58) Field of Search ........................... 398/154, 47, 53, 398/30, 79, 102, 161

(56) References Cited

U.S. PATENT DOCUMENTS

| | | | | |
|---|---|---|---|---|
| 5,629,983 A | * | 5/1997 | Fujimoto | 380/46 |
| 5,636,045 A | * | 6/1997 | Okayama et al. | 359/140 |
| 5,673,133 A | * | 9/1997 | Imaoka et al. | 359/189 |
| 6,239,892 B1 | * | 5/2001 | Davidson | 359/135 |
| 6,330,230 B1 | * | 12/2001 | R.ang.s.ang.nen | 370/280 |

FOREIGN PATENT DOCUMENTS

| | | |
|---|---|---|
| JP | 8-234255 | 9/1996 |
| JP | 9-93224 | 4/1997 |
| JP | 9-270769 | 10/1997 |

* cited by examiner

Primary Examiner—Leslie Pascal
Assistant Examiner—Dzung Tran
(74) Attorney, Agent, or Firm—Scully, Scott, Murphy & Presser

(57) ABSTRACT

An optical transmission system capable of alleviating the non-linear optical effect from overhead portions of a bit pattern comprised of a plurality of bits, wherein a plurality of optical transmit devices input a clock signal of identical phase and frequency, and optical signals whose overhead positions are changed on each wavelength by respective variable delay lines under the control of a phase controller are sent to a transmit side WDM device. At the transmit side WDM device, these optical signals are multiplexed in a wavelength multiplexer and sent to the receive side WDM device. Receive side optical transmission devices receive the respectively isolated optical signals. A phase controller offsets the positions of the optical signals and sends them to the overhead on each wavelength so that the non-linear effect of the receive optical signal is suppressed and a satisfactory signal can be received.

6 Claims, 27 Drawing Sheets

| DEVICE | CHARACTERISTIC DELAY |
|--------|---------------------|
| $D_1$  | $T_1$               |
| $D_2$  | $T_2$               |
| ⋮      | ⋮                   |
| $D_M$  | $T_M$               |

|←— 1BIT —→|

|←— 1BIT —→|

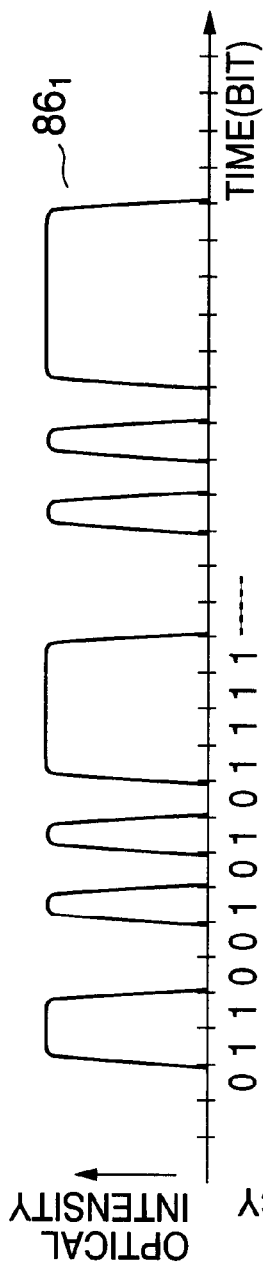
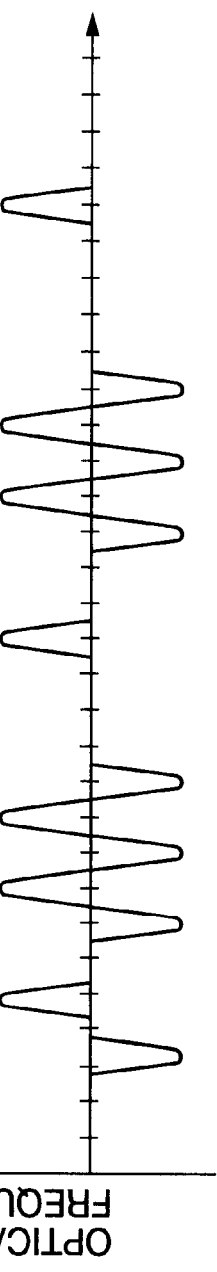
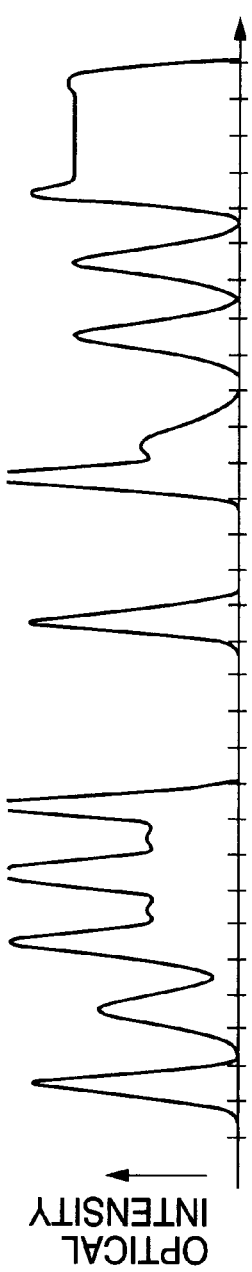
Fig.35(a) Fig.35(b) Fig.35(c) Fig.35(d)

| US 6,619,867 B1 |

OPTICAL TRANSMISSION SYSTEM

BACKGROUND OF THE INVENTION

1. Field of the Invention

The present invention relates to an optical transmission system utilizing wavelength multiplexing technology and in particular relates to an optical transmission system having stable transmission characteristics in the overhead portion of bit patterns comprised of a plurality of bits.

2. Description of Related Art

Along with the expanded demand for communications, greater demands are also being made for increased transmission capacity along each optical fiber. Wavelength division multiplexing is being developed to a practical level to provide greater transmission capacity. In order to provide greater transmission capacity by means of wavelength division multiplexing (WDM), problems such as attaining high speed signals, a high density placement of optical signals on a wavelength, an expanded bandwidth for the wavelength region being used, a high power optical signal and suppression of the non-linear optical effect must be dealt with.

The non-linear optical effect is an optical phenomenon caused by the non-linear response of matter and is found only in light that is nearly monochrome and has directivity such as laser light. The following are conditions known up until now under which the non-linear optical effect is prone to occur: (1) Relatively large optical power (2) Transmission in low-dispersion range of a fiber transmission path, (3) Narrow wavelength interval (4) Bit pattern matches with other channel intervals.

When using wavelength multiplexing such as WDM technology, the non-linear optical effect is easily prone to occur when the bit or bit pattern of an optical signal is phase-matched.

FIG. 29 is a block diagram of an experimental optical transmission system showing the non-linear optical effect due to phase-matching of the bit. This optical transmission system is comprised of a standard semiconductor laser 12 to output a standard laser beam 11 of a standard wavelength $\lambda_s$, and a reference semiconductor lasers $14_1 \ldots 14_N$ to output a reference laser beam $13_1 \ldots 13_N$ on a wavelengths $\lambda_1 \ldots \lambda_N$.

The standard laser beam 11 output from the semiconductor laser 12 is input to an optical modulator 16 and modulated by a specified pulse pattern output from a pulse pattern (PPG) generator 18. After modulation, the laser light 19 is input to one input of an optical coupler 21. The reference laser beam $13_1 \ldots 13_N$ output from the reference semiconductor lasers $14_1 \ldots 14_N$, is input to a wavelength multiplexer 24 and subjected to wavelength multiplexing. The laser light 23 is input to an optical modulator 24 after multiplexing, and modulated by a specified pulse pattern 26 output from a pulse pattern generator 25.

After combining in the optical coupler 22, the laser light 28 is input to a bit correlation eliminator (DCL) 29, then input to an optical amplifier 31, and amplified and sent to a first transmission fiber $31_1$. This laser light passes through the transmission path optical fibers $32_1, \ldots 32_k, 32_{(k+1)}$ as well as the optical amplifiers $31_2, \ldots 31_k, 31_{(k+1)}$ and is transmitted to the optical band path filter of the other (remote) party. The wavelength of the standard laser 11 and the reference laser beam $13_1 \ldots 13_N$ is the wavelength within the gain-bandwidth of the optical amplifiers $31_2, \ldots 31_k, 31_{(k+1)}$. After only passing the wavelength $\lambda$ on the receive side, the laser light 35 is input to a receive circuit 36. This receive circuit 36 is connected to an error detector 37.

In this kind of experimental system, modulation is applied simultaneously on and overhead comprised of identical bit patterns for all wavelengths $\lambda_s, \lambda_1 \ldots \lambda_N$, phase-matching conditions then provided, and on/off settings made on the bit correlation eliminator (DCL) 29 in order to eliminate bit correlation in this state, and the propagation characteristics measured for respective states. The bit correlation eliminator (DCL) is comprised of dispersion compensating fiber and has a dispersion characteristic of approximately −400 ps (picoseconds) per nanometer on the wavelength bandwidth being used.

In this experiment, the type N for the reference laser beam $13_1 \ldots 13_N$ wavelengths is set as "11" and the figure K for the optical amplifiers $31_2, \ldots 31_k, 31_{(k+1)}$ is set as "3". Also, DSF (dispersion shifted fiber) 8.0 kilometers each were used in the respective transmission path optical fibers $32_1, \ldots -32_4$. The output levels of the $31_2, \ldots 31_4$ were all +5 dBm per 1 channel.

Measurement results for the experimental optical transmission systems are shown in FIG. 30 through FIG. 32. Of these figures, FIG. 30 shows the code error rate during receive. The test points with X marks 41 in this figure, indicate the bit correlation eliminator 29 is off and bit correlation is not being canceled. In this state, bit phase matches are present. The test point with the "○" marks 42 in contrast, indicate that the bit correlation eliminator 29 is on and bit correlation is being canceled. The bit phase matches are greatly reduced at this time.

FIG. 31 shows the receive optical waveform when the bit correlation eliminator 29 is off and bit matching of each wavelength $\lambda_s, \lambda_1 \ldots \lambda_N$, is being performed. In FIG. 32 the receive optical waveform is shown, with the bit correlation eliminator 29 on and bit matching of each wavelength $\lambda_s, \lambda_1 \ldots \lambda_N$, is not being performed. In both FIG. 31 and FIG. 32, a waveform of 2.5 Gb/s (gigabytes per second) is shown.

The horizontal axis in FIG. 30 shows the average power of the light level being received. Usually, the bit error rate on the vertical axis decreases when the optical signal receive level is raised. However, with the bit correlation eliminator 29 off, the bit error rate will not fall below $10^{-5}$, even if the receive level (power) is increased and a higher SIN (signal-to-noise) ratio for the optical signal as shown in FIG. 30. This state is due to a non-linear optical effect in the receive optical signal itself. If the bit correlation eliminator 29 is on however, the extent of bit phase matching decreases greatly. Therefore, the error rate will be reduced to a sufficiently small value if the receive level (power) is increased and the optical signal given a higher S/N (signal-to-noise) ratio, as clearly shown by the one-bit interval change in the waveform in FIG. 32 much more clearly than in FIG. 31.

FIG. 33 shows the configuration of an optical transmission system utilized in the related art to eliminate effects from the non-linear optical effect. This system contains one standard clock supply device 51. The clock signals 52 are output from the standard clock supply device 51 on an identical frequency and identical phase and are supplied to a plurality of transmit side optical transmission devices $53_1, 53_2, \ldots 53_N$. These transmit side optical transmission devices $53_1, 53_2, \ldots 53_N$ each contain a clock interface (clock I/F) 55, a frame processor 56 input with frame pulses 56 from these transmit side optical transmission devices $53_1, 53_2, \ldots 53_N$, and an electrical-optical converter (E/O) 58.

The clock interfaces 55 are circuits comprised of frequency dividers to convert the clock signal 52 supplied from the standard clock supply device 51 to a clock frequency signal appropriate for its own transmit side optical transmission devices 53. The respective transmit side optical transmission devices $53_1, 53_2, \ldots 53_N$ require their own unique clock frequency for occasions when discrepancies exist between the signal processing contents themselves or the manufacturer. The frame processor 57 processes the externally input data signals 59 by utilizing the frame pulses 56. The electrical signals 61 of the frame format that was generated are input to the electrical-optical converter (E/O) 58 and converted to optical signal $62_1$. Signal processing results from respective transmit side optical transmission devices $53_1, 53_2, \ldots 53_N$ are converted to optical signals $62_1, 62_2 \ldots 62_N$ in the same way and output.

These optical signals $62_1, 62_2 \ldots 62_N$ are input to the transmit side WDM device 64. The transmit side WDM device 64 contains optical interfaces $64_1, 64_2, \ldots 64_N$ to input the respective optical signals $62_1, 62_2, \ldots 62_N$ a wavelength multiplier 65 located at the output of these interfaces 64, and an optical amplifier $67_1$, to amplify the optical signals 66 multiplexed in the wavelength multiplier 65. The optical interfaces $64_1, 64_2, \ldots 64_N$ are set beforehand with mutually different delay times for the received optical signals $62_1, 62_2, \ldots 62_n$ so that the phase of the bit patterns of the respective overhead portions are mutually offset from each other.

An optical signal of wavelengths 21 . output from the optical amplifier 67 is input to the optical amplifier $67_{(k+1)}$ of the receive side WDM device 73 by way of optical transmission path fibers $71_1, \ldots 71_K, 71_{(K+1)}$ and the optical amplifiers $67_2, \ldots 67_K$, and then isolated into the optical signals $74_1, 74_2 \ldots 74_n$, of respective wavelengths $\lambda_1 \ldots \lambda_N$ in a wavelength isolator 74. These optical signals $74_1, 74_2 \ldots 74_n$ are converted into data signals optical signals $76_1, 76_2 \ldots 76_n$, and supplied by way of receive side optical transmission device $75_1, 75_2 \ldots 75_n$, to a portion of a circuit in a latter stage not shown in the drawing.

A precondition for such kind of optical transmission systems of the related art was that the respective transmit side optical transmission devices $53_1, 53_2, \ldots 53_N$, shown in FIG. 33 have exactly the same electrical characteristics. Under this condition, the bit pattern of the overhead portion of the respective optical signals were made to have different phases by a method for instance, for increasing the amount of delay by several sequential bits. The composition of the data of the optical signals sent by the respective transmit side optical transmission devices $53_1, 53_2, \ldots 53_N$ were of course then different, but the overhead portion placed prior to these data portions in many cases had patterns identical or only slightly different from the bit patterns. So in order to suppress the non-linear optical effect and reproduce a satisfactory overhead portion of these bit patterns, the positions of the respective overhead portions were offset or displaced over time.

In actual fact however, as previously explained, the individual transmit side optical transmission devices $53_1, 53_2, \ldots 53_N$ do not necessarily always have identical electrical characteristics. To the contrary, the electrical characteristics are in many cases different due to variations between the manufacturers. So even therefore, assuming no measures are taken to delay the phase of the transmit side optical transmission devices $53_1, 53_2, \ldots 53_N$ and that all process the overhead and the following data at absolutely the same timing, the mutual time position of the respective optical signals, or in other words, the phase will usually very to a small degree, after passing through these transmit side optical transmission devices $53_1, 53_2, \ldots 53_N$.

Consequently, even if measures is taken on purpose, to provide a phase delay means to delay the phase for each of the transmit side optical transmission devices $53_1, 53^2, \ldots 53_N$, if the amount of phase delay occurring due to this delay means and the amount of delay due to individual characteristics of each of the transmit side optical transmission devices $53_1, 53_2, \ldots 53_N$ are identical amounts with different plus and minus signs, then bit pattern phase differentials may cancel each other out causing a phase of zero or near zero to occur. In such a case, that pair of overheads will be susceptible to the non-linear optical effect and reproducing that data is difficult.

Further, even assuming that, an effect is obtained so that the overhead bit pattern portions have mutually different phases at that time, replacement of some of those transmit side optical transmission devices $53_1, 53_2, \ldots 53_N$ will prove necessary at some point. Replacement brings the possibility that optical signals will be reproduced in which the bit pattern phases essentially match each other, so signals with poor transmission characteristics will likely be transmitted due to the non-linear optical effect.

Japanese Patent Laid-open 7-66779 (published patent) also discloses a measure to suppress the non-linear optical effect so that method is briefly explained and the objective of this invention clarified.

FIG. 34 is a drawing showing the overall structure of that disclosed optical transmission system. This system is comprised of a transmit station 81, a receive station 82, optical fibers $83_1, 83_2, \ldots$ arrayed in series to connect between the stations 81 and 82, optical amplifiers $84_1, 84_2, \ldots$, and optical group dispersion compensating fibers $85_1, 85_2, \ldots 85_N$. The transmit station 81 is comprised a plurality of optical transmitters $86_1, 86_2, \ldots$, and optical coupler 87 to couple the optical signals of different wavelengths sent from the optical transmitters $86_1, 86_2$, and an optical amplifier 88 to amplify the coupled optical signals. The receive station 82 is comprised of an optical divider 91 to divide the optical signals received from the receive station 82, and receivers $92_1, 92_2, \ldots$ to receive the respective optical signals of different wavelengths after division.

In this disclosed optical transmission system, each bit of a bit pattern is generated at a time difference one-half or more that of the other bit so that the mutual phase modulation effect between bits is suppressed.

FIGS. 35(a) to 35(d) show the signal processing in a system preceding the previous disclosed optical transmission system. In this preceding disclosed system, the optical group dispersion compensating fibers $85_1, 85_2, \ldots 85_N$ of the previous proposed optical transmission system of FIG. 34 are omitted and a direct connection made. FIG. 35(a) shows the transmit signal waveform for one of the optical transmitters $86_1$, shown in FIG. 34. A precondition is that modulation of the transmit signal be NRZ (Non Return To Zero) modulation. The "0" or the "1" shown on the horizontal axis indicate the status of the respective bit.

FIG. 35(b) shows XPM (Cross Phase Modulation) frequency chirp brought about by an optical signal such as shown in FIG. 35(a). This waveform is the optical intensity waveform differential of the optical signal shown in FIG. 35(a). Therefore, in this signal waveform, the rising edges on this waveform of FIG. 35(a) are negative and falling edges are positive.

FIG. 35(c) shows the waveform of the optical signal of another one optical transmitters 862 shown in FIG. 34. FIG. 34(d) shows the waveform received from the receive station 82 output from these two optical transmitters $86_1, 86_2$. As shown in this FIG. 34(d), the high value of this received waveform has large fluctuations and the waveform changes greatly so that accurately isolating these signals is impossible.

FIGS. 36(a) to 36(d) show the signal processing in the disclosed optical transmission system. In this method, the optical signals are delayed by respective one bit periods by means of the optical group dispersion compensating fibers $85_1$, $85_2$, . . . $85_N$ shown in FIG. 34. Therefore, the XPM frequency chirp (B of same figure) generated inside the optical fiber $83_1$, and the XPM frequency chirp (C of same figure) generated inside the optical fiber $83_2$ in the waveform of the transmit signal of another one of the optical transmitters $86_2$ such as shown in FIG. 36(a), are slightly offset on the time axis to have a interval of ½ bit or more. The waveform of the receive station 82 from the transmit signal of another one of the optical transmitters $86_2$ becomes a waveform such as shown in FIG. 36(d) the distortion of the waveform as seen in bit units becomes small, and these signals can be satisfactorily received and reproduced.

In the disclosed optical transmission systems as described in FIG. 34 through FIGS. 36(a) to 36(d), alleviation of the non-linear optical effect was attempted by changes in each one bit of data and is therefore basically different from technology to resolve the non-linear optical effect in entire bit patterns comprised of a plurality of bits.

SUMMARY OF THE INVENTION

In view of the above problems with the related art, this invention has the object of providing an optical transmission system to reduce the non-linear optical effect in overhead portions of bit patterns comprised of a plurality of bits.

According to first aspect of the invention, an optical transmission system has; (A) a plurality of transmit side optical transmission devices to make respectively unique frames having the same frame period based on an identical standard clock, add an overhead of specified length to the beginning of these frames and send as respectively different optical signals and, (B) a wavelength-division multiplexing signal transmission means to perform wavelength-division multiplexing of optical signals of different wavelengths sent from a plurality of transmit side optical transmission devices, and send to a device on the receive side by way of the transmission path and, (C) an overhead phase alignment means to store beforehand the time offsets of the frames generated using said standard clock at said plurality of transmit side optical transmission devices, and set the amount of time delay of optical signals output from said plurality of transmit side optical transmission devices so that the overheads at each of these transmit side optical transmission devices are provided with a mutual time offset and wavelength multiplexed.

In other words, first aspect of the invention aligns the phase of overheads of optical signals output from a wavelength-division multiplexing signal transmission means from signals whose frames start at essentially a completely identical timing based on the same clock frequency. The frames that are generated have time differentials due to differences among manufacturers of the optical transmission devices and the circuits being used. These frame time differentials are compensated for and the phase of this signals aligned so that overheads will be mutually provided with a time offset and wavelength multiplexed. The overhead phase alignment means therefore stores beforehand the time offset of that frames that are generated when a standard clock is used at each of the plurality of transmit side optical transmission devices, and sets a delay in the optical signal output from these transmit side optical transmission devices so that the overheads will have a mutual time offset and are wavelength multiplexed.

Therefore, according to first aspect of the invention, there is no need to determine the respective overhead positions of the optical signals actually sent from the plurality of transmit side optical transmission devices, and the overhead positions for the respective optical signal wavelengths can be easily offset, so that the non-linear optical effect can be easily reduced.

According to second aspect of the invention, an optical transmission system has; (A) a plurality of transmit side optical transmission devices to make respective unique frames based on identical standard clocks, add an overhead of specified length to the beginning of these frames and send them as respectively different optical signals and, (B) a phase detection means to detect the time offsets of overheads in optical signals sent from the plurality of transmit side optical transmission devices and, (C) an overhead phase alignment to set the amount of time delay for optical signals output from the plurality of transmit side optical transmission devices based on results from said discrimination means, so that overheads at each or the transmit side optical transmission devices have a mutual time offset and are wavelength multiplexed and, (D) and a wavelength division multiplexing means to receive the optical signals with delays adjusted by the overhead phase alignment means from the plurality of transmit side optical transmission devices, and perform wavelength division multiplexing of the signals of different wavelengths, and send along a transmission path to a receive side device.

In other words, second aspect of the invention differs from the first aspect of the invention in that a phase detection means detects the time offsets of overheads in optical signals sent from the plurality of transmit side optical transmission devices, and sets the delay amount of the optical signal sent from the transmit side optical transmission devices so that the chase of the overhead will be offset according to the detected results. Feedback control is thus performed in this way so that even if a completely new transmit side transmission device is installed, or the electrical characteristics of an already used transmit side transmission device change, the offset in the overhead of these optical signals that were output will still be correctly set and the non-linear optical effect can be alleviated.

According to third aspect of the invention, the optical transmission system has; (A) a plurality of transmit side optical transmission devices to make respective unique frames based on identical standard clocks, add an overhead of specified length to the beginning of these frames and send them as respectively different optical signals and, (B) a phase detection means to detect the time offsets of overheads in optical signals sent from the plurality of transmit side optical transmission devices and, (C) an overhead phase alignment to set the amount of time delay for optical signals based on results it from the detection means, so that overheads at each of the transmit side optical transmission devices have a mutual time offset and are wavelength multiplexed and, (D) a wavelength division multiplexing means to perform wavelength division multiplexing of the optical signals with delays adjusted by the overhead phase alignment means and send along a transmission path to a receive side device.

In other words, third aspect of the invention differs from the first aspect of the invention in that a detection means detects the time offsets of overheads in optical signals sent from the plurality of transmit side optical transmission devices, and sets the delay amount of the optical signal sent from the transmit side optical transmission devices so that the phase of the overhead will be offset according to the phase detection results. Third aspect of the invention differs from the third aspect of the invention in that the delay amount is not set at the transmit side optical transmission device end, and the amount of delay in the optical signal sent from the transmit side optical transmission devices is adjusted at each wavelength before performing wavelength-division multiplexing. Feedback control is thus performed in this way so that even if a completely new transmit side transmission device is installed, or the electrical characteristics of an already used transmit side transmission device change, the offset in the overhead of these optical signals that were output will still be correctly set and the non-linear optical effect can be alleviated. There is also no need to set the amount of delay at the transmit side optical transmission device end so the circuit has a simpler structure.

According to fourth aspect of the invention, the optical transmission system has; (A) a plurality of transmit side optical transmission devices to make respective unique frames based on identical standard clocks, add an overhead of specified length to the beginning of these frames and send them as respectively different optical signals and, (B) a phase detection means to determine the time offsets of overheads in optical signals sent from the plurality of transmit side optical transmission devices and, (C) a wavelength-division multiplexing means to perform wavelength division multiplexing of the optical signals from said phase detection mean, and (D) a selectable phase dispersion means to select a desired dispersion fiber from a plurality of dispersion fibers of different dispersion values for differing wavelengths and, (E) a selection means to select a dispersion fiber having the most effect in reducing the non-linear optical effect in optical signals which is launched into transmission fiber as wavelength multiplexed signals.

In other words, fourth aspect of the invention, determines the time offset of the overhead in the optical signal sent from the plurality of transmit side optical transmission devices, and controls a switching means so that dispersion fibers can be selected for optimum placement of wavelength offsets. The overheads can be placed as needed without having to use a special delay means, and the non-linear optical effect can be reduced.

BRIEF DESCRIPTION OF THE DRAWINGS

FIG. 32 is a waveform showing the received light waveform when bit-matching is not performed, and the bit correlation canceling shown in FIG. 29 is on.

FIGS. 35(a) to 35(d) are various waveform diagrams showing the signal processing in the preceding disclosed optical transmission system of FIG. 34.

DETAILED DESCRIPTION OF THE PREFERRED EMBODIMENTS

Figure 1:
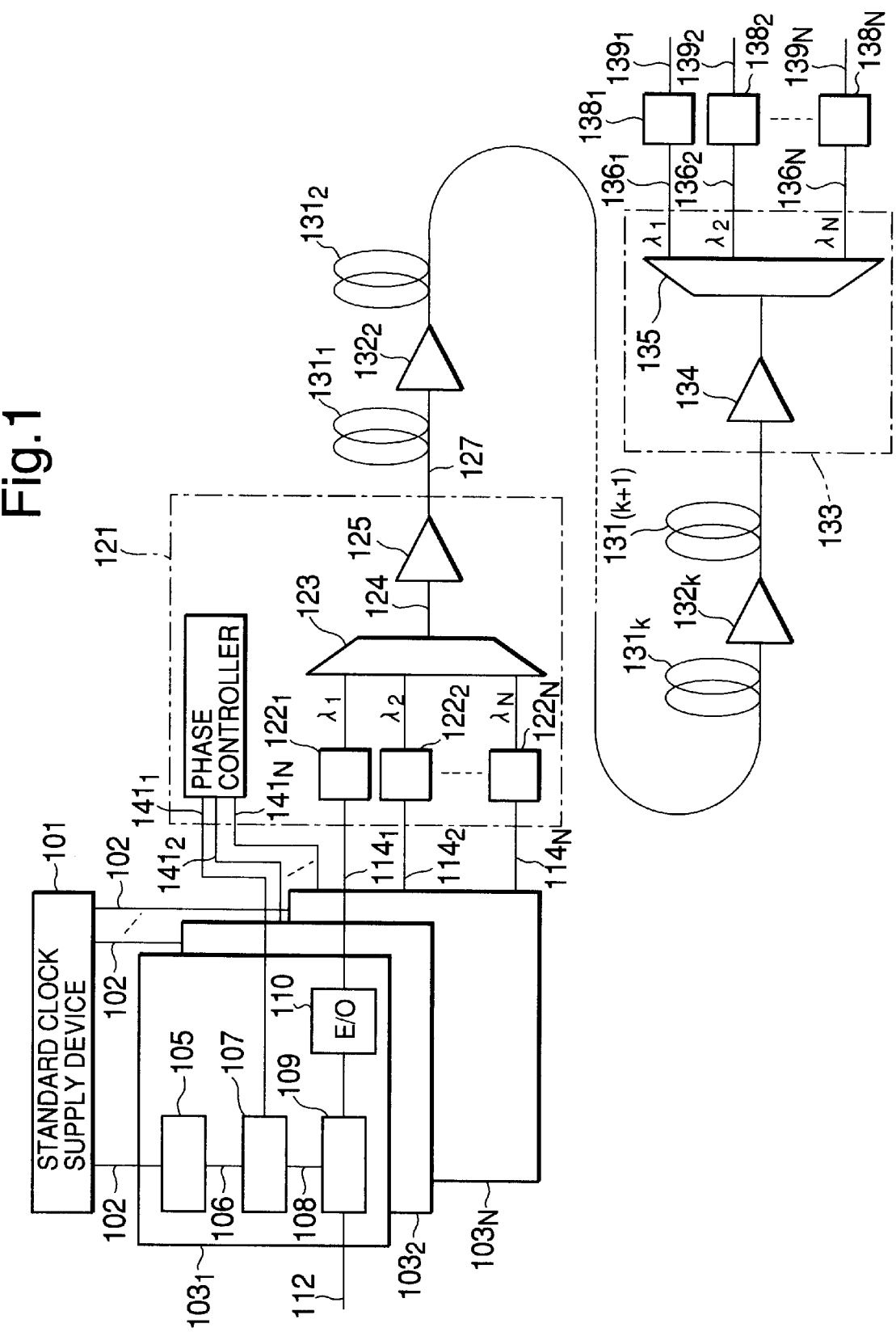
FIG. 1 is a blocs diagram showing the structure of the optical transmission system of the first embodiment of this invention.

The following embodiments of the invention will be next described in detail while referring to the drawings. First Embodiment FIG. 1 is a block diagram showing the structure of the optical transmission system of the first embodiment of this invention. This system contains one standard clock supply device 101. The clock signals 102 output from the standard clock supply device 101 are of the same frequency and the same phase and are supplied to the respective plurality of transmit side optical transmission devices $103_1$, $103_2$, ... $103_N$. Here, the plurality of transmit side optical transmission devices $103_1$, $103_2$, ... $103_N$ are comprised of a clock interface (clock I/F) 105, a variable delay circuit 107 supplied with frame pulses 106 the output from clock I/F 105, a frame processor 109 input with delay frame pulses 108 delayed by the variable delay circuit 107, and an electrical/optical (E/O) converter 110.

The clock interface 105 is a circuit that converts the clock signals 102 supplied from the standard clock supply device 101 to clock frequency signals corresponding to the internal configuration of its own transmit side optical transmission device $103_1$, and is comprised of frequency dividers not shown in the drawing. The transmit side optical transmission devices $103_1$, $103_2$, ... $103_N$ sometimes vary from one other due to the signal processing content and differences among manufacturers, and usually require clocks at various individual frequencies. The frame processor 109 processes data signals input from external sources by using the delay frame pulse 108, and generates a frame format. The electrical signals from the frame format that was generated are input to the electrical/optical (E/O) converter 110, and converted to an optical signal $114_1$. In the same way, data signals input respectively from other $103_2$, ... $103_N$ not shown in the drawing are processed, and the results converted to optical signals $114_2$, ... $114_N$ and output.

The optical signals $114_1$, $114_2$, ... $114_N$ output from the transmit side optical transmission devices $103_1$, $103_2$, ... $103_N$ are input to the transmit side WDM device 121. The transmit side WDM device 121 is comprised of interfaces $122_1$, $122_2$, ... $122_N$ to input corresponding signals from the optical signals $114_1$, $114_2$, ... $114_N$ and, a wavelength multiplexer 123 installed on the output side of the interfaces 122, and an optical amplifier 125 to amplify the output signal 124 multiplexed by the wavelength multiplexer 123, as well as a phase controller 126 to control the phase of the received optical signals $114_1$, $114_2$, ... $114_N$. A wavelength multiplexed optical signal 127 with the respective appropriately controlled phase of the wavelengths $\lambda_1$ ... $\lambda_N$ of the bit patterns is output from the optical amplifier 125.

The optical signal 127 output from the optical amplifier 125 is input to the receive side WDM device 133 by way of the transmission path optical fibers $132_1$, ... $132_k$, $132_{(k+1)}$ and the optical amplifiers $132_1$, ... $132_{(k+1)}$. In the receive side WDM device 133, an optical amplifier 14 amplifies these optical signals, and a wavelength isolator 135 isolates these into the optical signals $136_1$, $136_2$, ... $136_N$ of the respective wavelengths $\lambda_1$ ... $\lambda_N$. The receive side optical transmission device, receives these isolated optical signals $136_1$, $136_2$, ... $136_N$ and supplies these signals as respective bit pattern data signals $139_1$, $139_2$, ... $139_N$, to the circuit of a latter stage not shown in the drawings.

In an optical transmission system of this kind, a phase controller 126 inside the transmit side WDM device 121, controls the phase of the optical signals $114_1$, $114_2$, ... $114_N$, sent from the transmit side optical transmission devices $103_1$, $103_2$, ... $103_N$. The control lines $141_1$, $141_2$, ... $141_N$ are therefore installed to convey specified signals such as phase control signals output from the phase controller 126 to the transmit side WDM device 121 and each of the transmit side optical transmission devices $103_1$, $103_2$, ... $103_N$. The optical signals $114_1$, $114_2$, ... $114_N$ for each of the wavelengths $\lambda_1$ ... $\lambda_2$ in the embodiment, are controlled to change the phase of the overhead portion by utilizing these control lines $141_1$, $141_2$, ... $141_N$.

Figure 2:
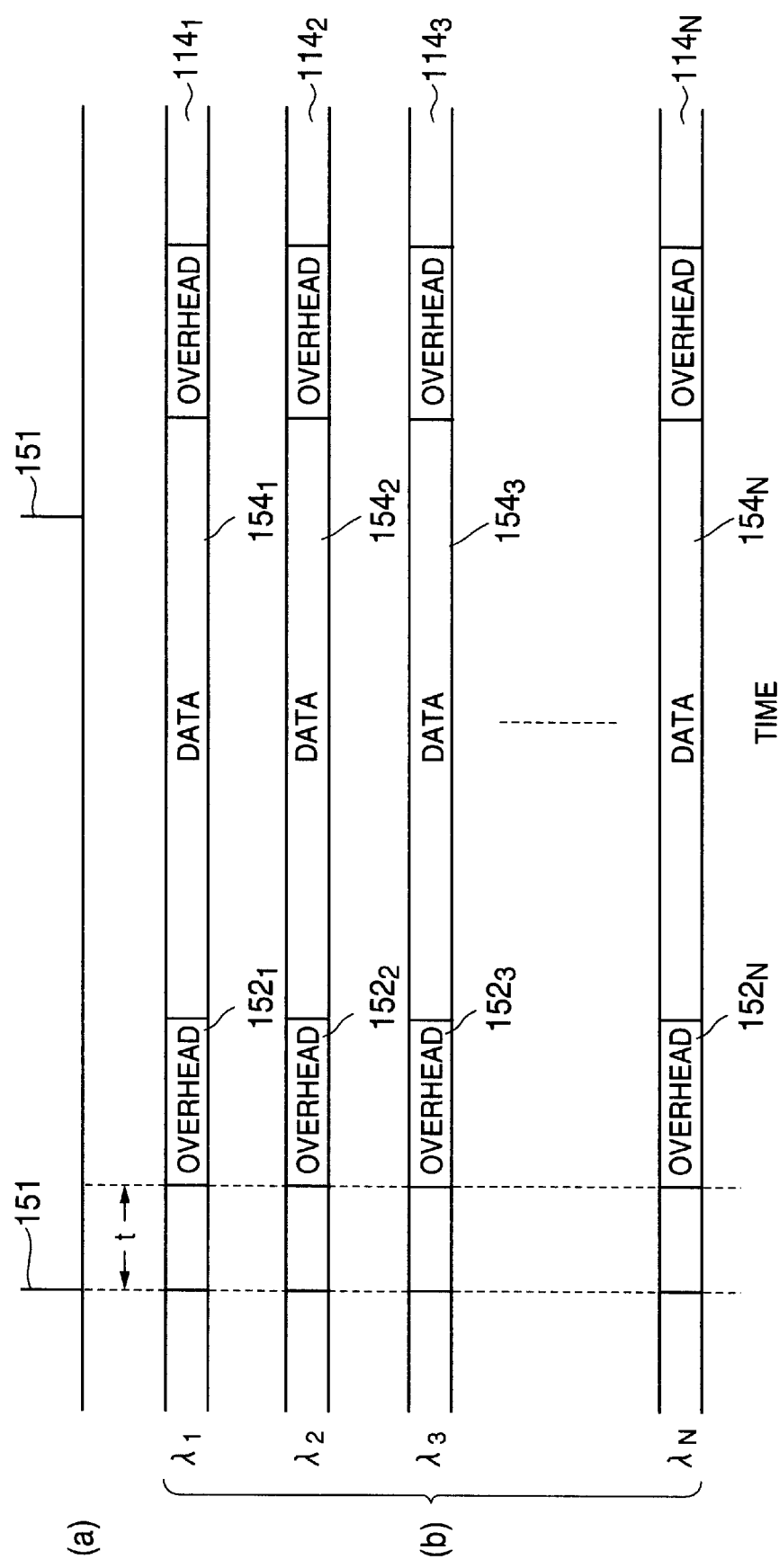
FIG. 2 is a timing diagram illustrating the theoretical position relationship when the transmit timing for optical signals of each wavelength completely match each other and phase control by means of a phase controller is not performed.

FIG. 2 is a timing diagram illustrating the theoretical position relationship when the transmit timing for optical signals of each wavelength completely matches each other and phase control by means of a phase controller is not performed. In this figure, the optical signals $114_1$, $114_2$, ... $114_N$ on wavelengths $\lambda_1$ ... $\lambda_N$ are assumed to output at a timing identical to that shown in FIG. 1.

A diagram for the standard clock 101 in FIG. 1 is shown in FIG. 2A. Each of the transmit side optical transmission devices $103_1$, $103_2$, ... $103_N$ typified by SDH (synchronous digital hierarchy) or SONET (Synchronous Optical NETwork) are input with clock signals 102 from the standard clock supply device 101, and makes a frame utilizing frame synchronizing pulses 151 based on the original clock signal 102, without performing any delay operation with the variable delay circuit 107. The overheads are then placed in the beginning of these frames, in synchronization with these frame synchronizing pulses 151. Therefore, in an interval from the time the frame synchronizing pulse 151 is issued until a specified processing time t has elapsed, the overheads $152_1$, $152_2$, ... $152_N$, for the optical signals $114_1$, $114_2$, ... $114_N$, of each wavelengths $\lambda_1$ ... $\lambda_N$, are therefore placed as shown in FIG. 2B.

Assuming in this wave that the transmit side optical transmission devices $103_1$, $103_2$, ... $103_N$ are configured exactly the same, each of the overheads $152_1$, $152_2$, ... $152_N$ will be multiplexed at a completely identical timing. As previously explained, in the frame space consisting of the overheads $152_1$, $152_2$, ... $152_N$ and the following data $154_1$, $154_2$, ... $154_N$, the overheads $152_1$, $152_2$, ... $152_N$ using the same shared transmission path have extremely similar bit patterns. So that compared to the data $154_1$, $154_2$, ... $154_N$ which each have their own particular data contents, the non-linear optical effect on the overheads $152_1$, $152_2$, ... $152_N$ is extremely large.

Figure 3:
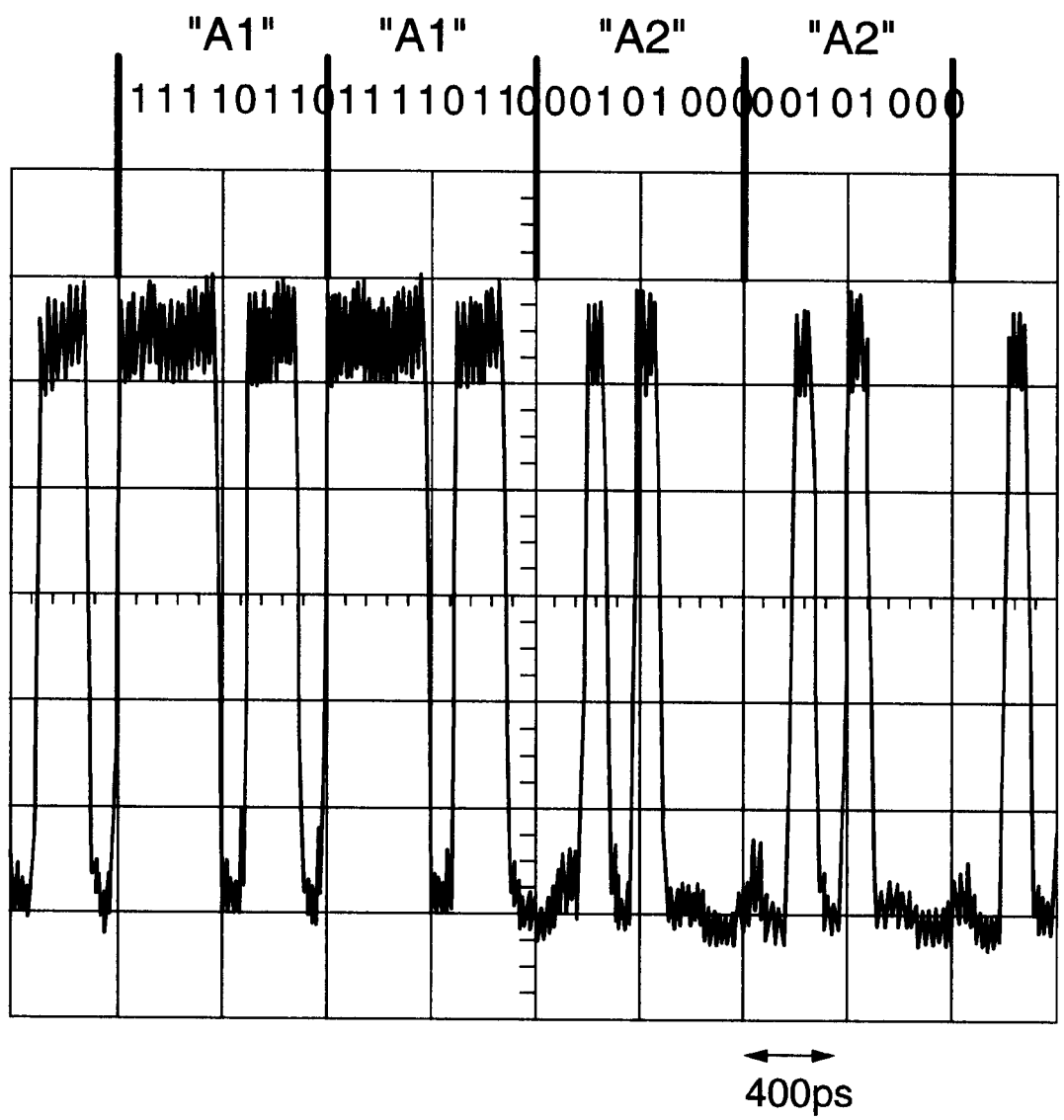
FIG. 3 is a waveform diagram of part of the overhead pattern when using an SDH frame format in the transmit side optical transmission device.

FIG. 3 is a waveform of part of the overhead pattern when using an SDH frame format in the transmit side optical transmission device. The SDH (synchronous digital hierarchy) utilizes a fixed pattern such as "A1" or "A2" as shown in the figure, as the frame format. Therefore, when the overheads $152w$, $152_2$, ... $152_N$ are issued at exactly the same timing, these fixed patterns are issued simultaneously at time intervals, and deterioration of the signal occurs due to the non-l-near optical effect. FIG. 3 showed the pattern waveform for bites "A1" or "A2" in STM-64 (100 Gb/s). In this figure, one mark on the scale indicates 400 ps.

Figure 4:
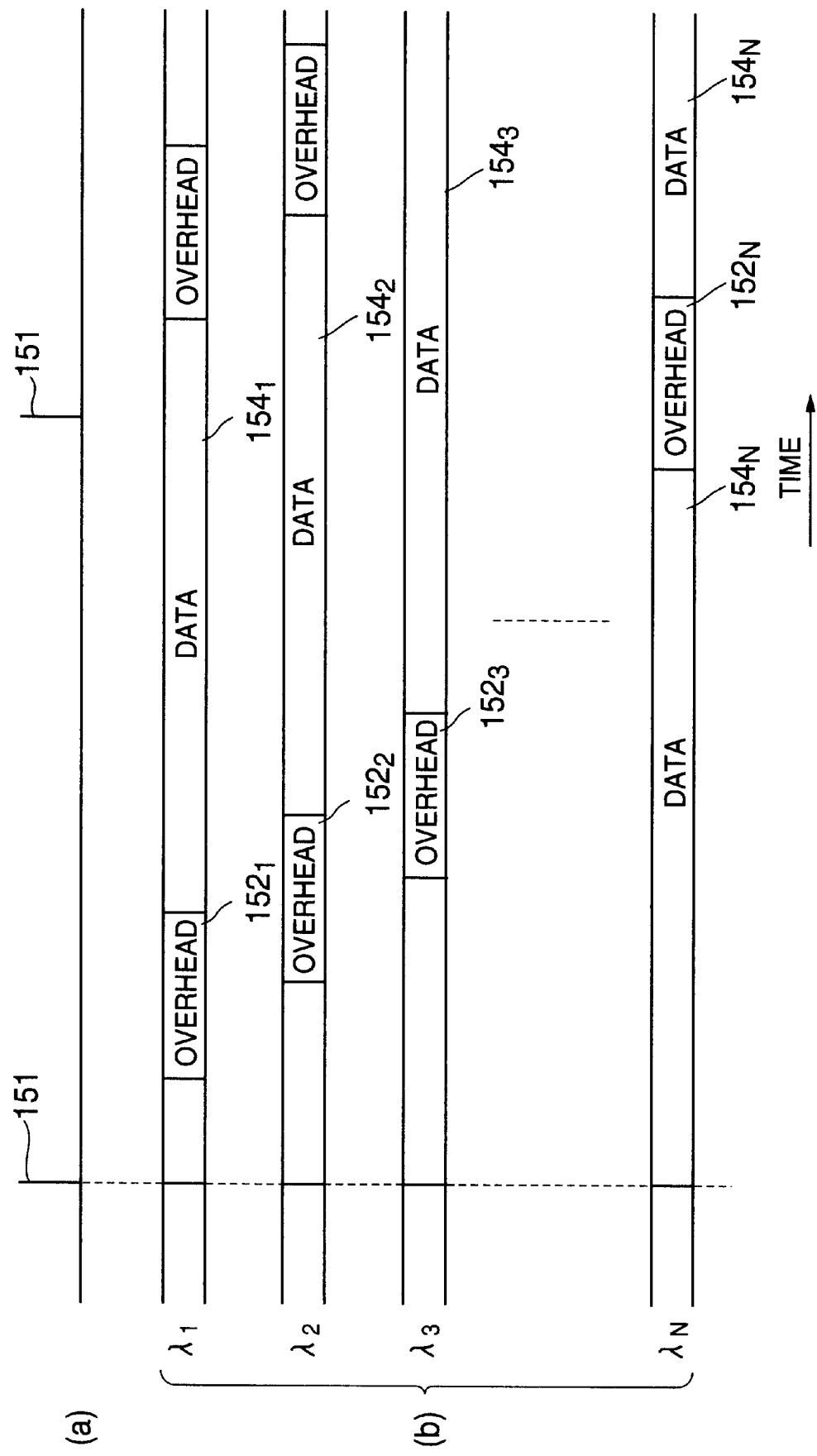
FIG. 4 is a timing diagram showing the effect on the transmission timing at each optical signal wavelength when phase control is implemented in the first embodiment.

FIG. 4 shows the effect on the transmission timing at each optical signal wavelength when phase control is implemented. Sections of this figure identical to FIG. 2 have identical reference numerals. In this embodiment, the phase controller 126 (FIG. 1) aligns the phase so the overheads $152_1$, $152_2$, ... $152_N$ of optical signals $114_1$, $114_2$, ... $114_N$, of each wavelengths $\lambda_1$ ... $\lambda_N$ are of mutually different phases (FIG. 4B). The overheads $152_1$, $152_2$, ... $152_N$ are thus mutually offset over time, and the non-linear optical effect is greatly reduced.

Figure 5:
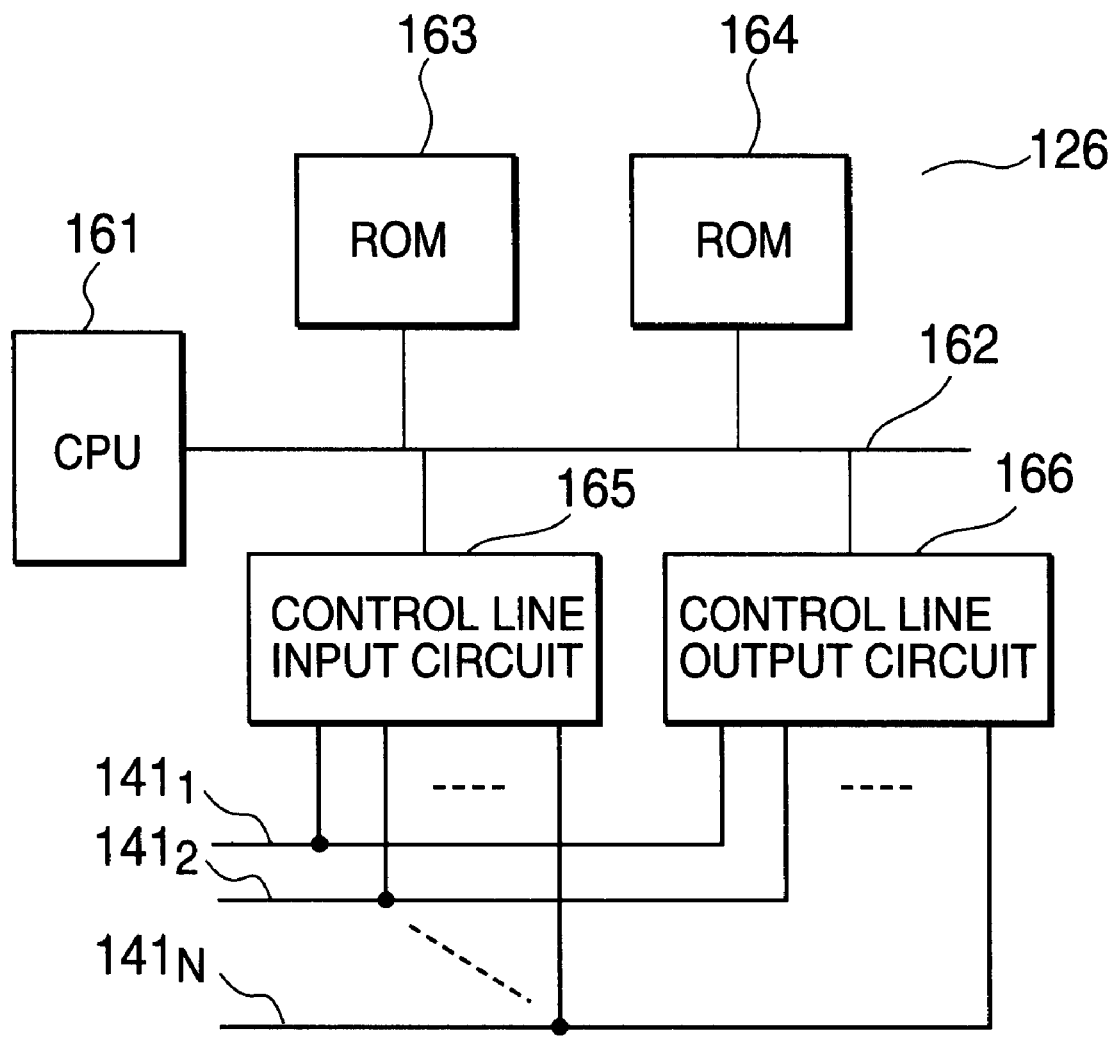
FIG. 5 is a block diagram showing the circuit configuration of the phase controller in the first embodiment.

FIG. 5 is a block diagram showing the circuit configuration of the phase controller in the first embodiment. A phase controller 126 contains a CPU (central processing unit) 161. The CPU161 is connected to sections of the transmit side WDM device 121 (FIG. 1) by way of a bus 162 such as a data bus. Of these sections, a ROM163 is a read-only-memory for storing specified tables and programs for controlling the variable delay circuit 107 inside the transmit side optical transmission devices $103_1$, $103_2$, ... $103_N$ and the transmit side WDM device. A RAM164 is a task memory for temporarily storing data for all types of control of the CPU161. A control line input circuit 165 connects to the control lines $141_1$, $141_2$, ... $141_N$ connected to the terminals of the transmit side optical transmission devices $103_1$, $103_2$, ... $103_N$ shown in FIG. 1, and inputs control signals for discriminating the type of transmit side optical transmission devices $103_1$, $103_2$, ... $103_N$. A control line output circuit 166 connects to the same control lines $141_1$, $141_2$, ... $141_N$, and outputs a control signal for setting the delay of each of the variable delay circuits 107.

FIG. is a flow chart showing the status of overhead phase control by the phase controller. This kind of phase control is performed during startup of the optical transmission system of this embodiment and when there were changes in all or a portion of the transmit side optical transmission devices $103_1$, $103_2$, ... $103_N$ system structure. First of all, the CPU161 sets a "1" (step S181) to reset (initialize) a specific parameter n, and receives a type-discriminator control signal (step S182) from the transmit side optical transmission devices $103_1$ to determine the type. A receiving format may send a type-discriminator control signal according to the request from the CPU161, or may be a format to sequentially read out at CPU161 the signal status for example, of dip switches (not shown in the drawing) of each of the transmit side optical transmission devices $103_1$, $103_2$, ... $103_N$, by way of the control lines $141_1$, $141_2$, ... $141_N$.

When the type-discriminator control signal is received from the transmit side optical transmission devices $103_1$, the CPU161 reads out (step S183) the overhead characteristic delay amount from the characteristic delay table stored in the ROM163 when processed by the transmit side optical transmission devices $103_1$.

Figures 7, 8:
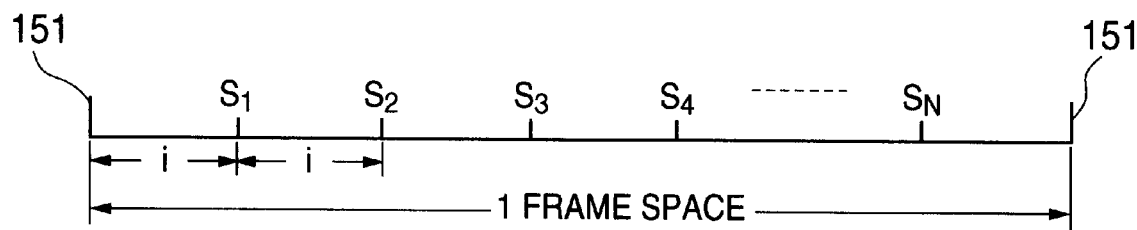
FIG. 7 is a drawing showing the structure of the characteristic delay table in the first embodiment.
FIG. 8 is a timing diagram showing the processing principle for calculating the delay time in the first embodiment.

FIG. 7 shows the structure of the characteristic delay table. A characteristic delay table 191 stores pre-investigated characteristic values $T_1$, $T_2$, ... $T_M$ required in specified processing, when creation of frames with identical timing was specified for any kind of devices $D_1$, $D_2$, ... $D_M$, capable of being used as the transmit side optical transmission devices $1031_1$, $103_2$, ... $103_N$. The contents of the characteristic delay table 191 cannot be changed or updated in this embodiment because of storage in the ROM163, however the latest information can be added by using a writable type as the characteristic delay table 191.

Figure 6:
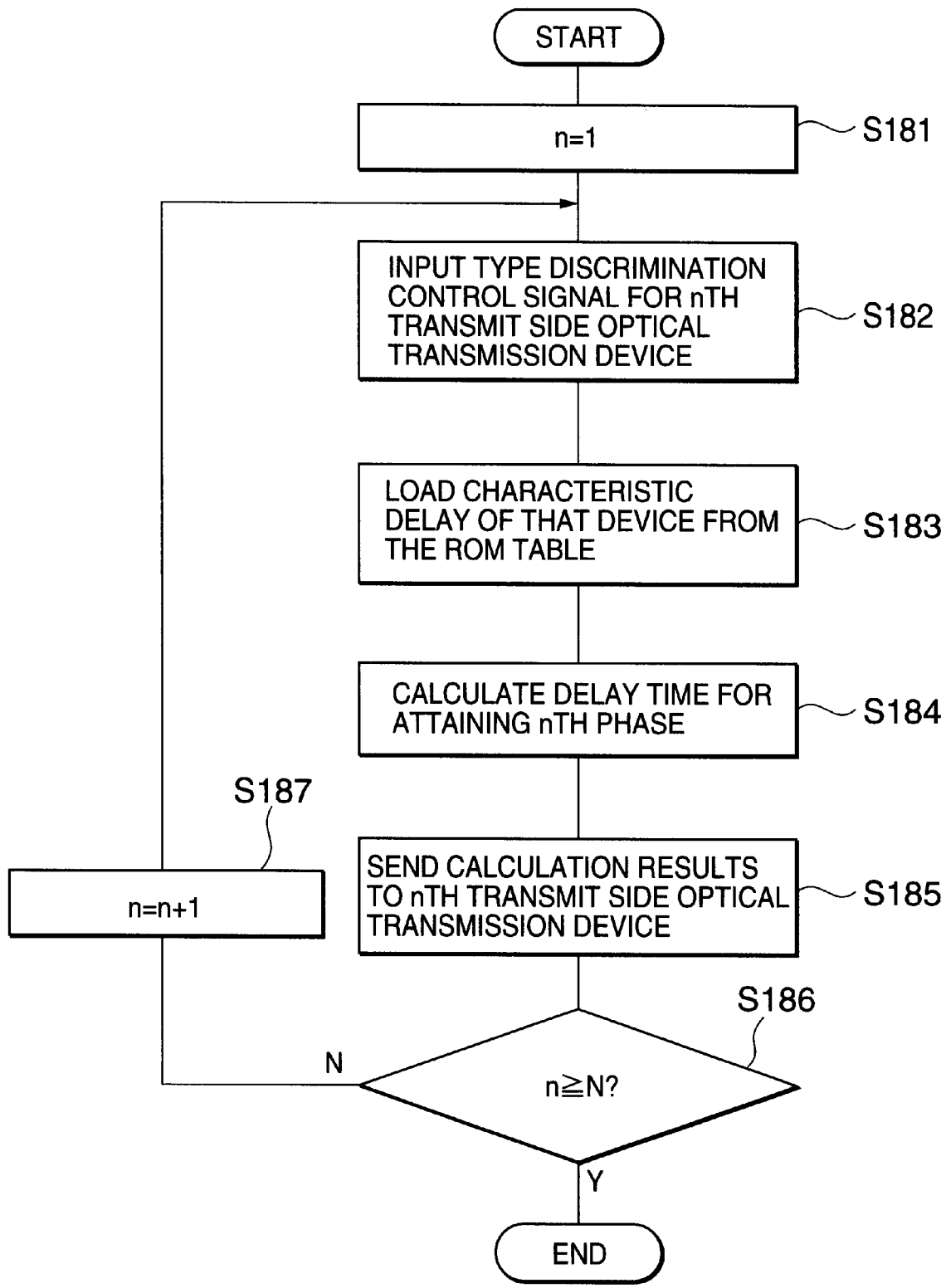
FIG. 6 is a flow chart showing the overhead phase control process by the phase controller in the first embodiment.

The explanation now returns to FIG. 6. After the CPU161 reads out (loads) the characteristic delays for the first transmit side optical transmission device $103_1$, from the characteristic delay table 191, the delay times required for the first transmit side optical transmission device $103_1$, are calculated (step S184). This delay time calculation is necessary to control the phase so that so the overheads $152_1$, $152_2$, ... $152_N$, for each wavelength $\lambda_1$ ... $\lambda_N$ of optical signals $114_1$, $114_2$, ... $114_N$ are sequentially offset over time.

FIG. 8 is a drawing showing the processing principle for calculating the delay time. In this embodiment, the delay time is set so that the respective overhead start positions $S_1$, $S_2$, ... $S_N$, are placed at specified time intervals i in the one frame space, from the frame synchronizing pulse 151 to the next frame synchronizing pulse 151. In other words, in the case of the first transmit side optical transmission device $103_1$, subtracting the first characteristic delay value $T_1$, from the time interval i, gives the delay time which should be added. In the case of the second transmit side optical transmission device $103_2$, twice the value 2i of the time space i, in other words, subtracting the second characteristic delay value $T_2$, from the time interval from issue of the frame synchronizing pulse 151 up to the second start position $S_2$, gives the additional delay time which should be added. The remainder of the process is performed in the same way.

When the delay time for the first transmit side optical transmission device $103_1$ is calculated in this way, that value is sent to the variable delay circuits 107 of the first transmit side optical transmission device $103_1$ (step S185). This added delay time is thus set in the variable delay circuits 107 of the first transmit side optical transmission device $103_2$, and as a result, the overhead $152_1$ of the variable delay circuits 107 of the first transmit side optical transmission device 103. starts from the first start position S1 (FIG. 8).

When adjusting of the overhead position for the first transmit side optical transmission device $103_1$ is finished, the CPU161 checks (step S186) as to whether the parameter n is now an "N" value. This "N" value is the total figure for transmit side optical transmission devices used in the system. If not yet an "N" value, the parameter n is made to count up by "1" (step S187) and the process proceeds to step S182. In other words, the process for delay time of the second transmit side optical transmission device $103_2$ is now performed. When the same process is completed for all the transmit side optical transmission devices $103_1$, $103_2$, ... $103_N$ (step S186:Y), the phase adjustment of the overhead by means of the phase controller 126 is finished (end).

Figure 9:
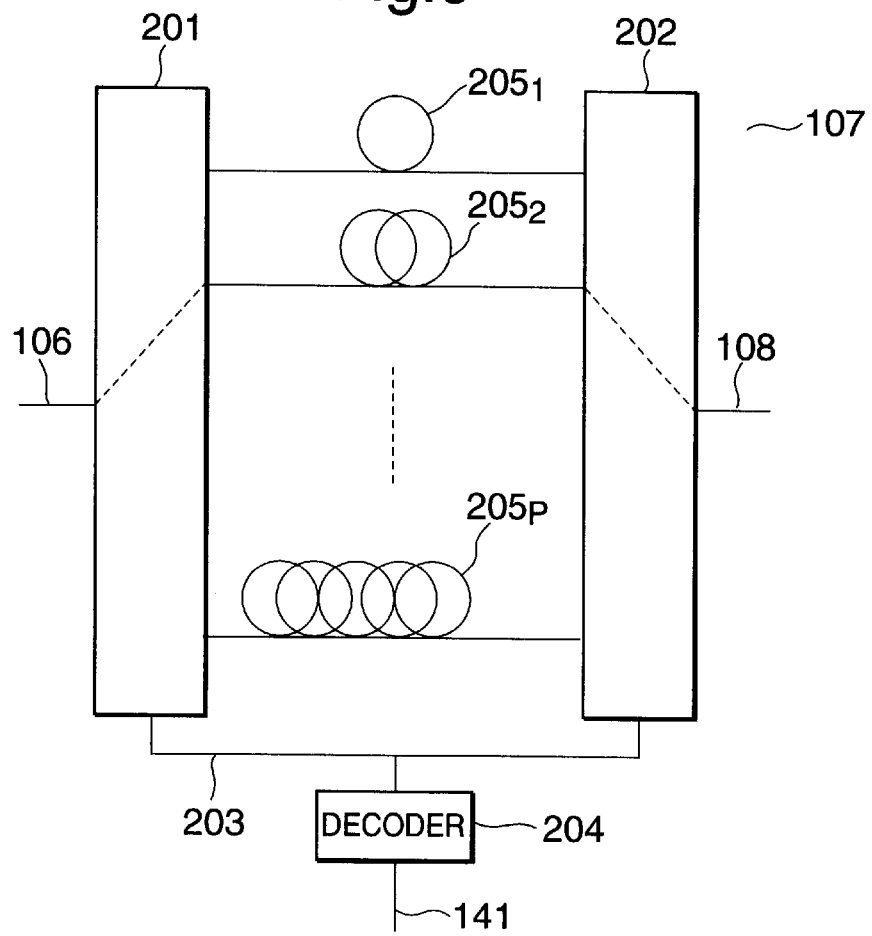
FIG. 9 is a drawing showing the structure of the variable delay section used in the first embodiment.

FIG. 9 is a drawing showing the structure of the variable delay section used in this embodiment. A variable delay circuit 107 is comprised of an input switching circuit 201 to input frame pulses 106 from the interface circuit 201, an output switching circuit 202 to output the delay frame pulse 108 to a frame processor 109 as shown in FIG. 1, and a plurality of delay optical fibers $205_1$, $205_2$, ... $205_p$, connecting between the i input switching circuit 201 and output switching circuit 202, and a decoder 204 to supply a switching signal 203 in common to the input switching circuit 201 and output switching circuit 202. These delay optical fibers $205_1$, $205_2$, ... $205_p$ have different respective lengths, are connected to respective contact points on the input switching circuit 201 and output switching circuit 202.

In a variable delay circuit 107 of this kind of structure, the calculated delay time is input to the decoder 204 from the control line 141. Based on this delay time, the decoder 204 selects a fiber to achieve this delay time from among the delay optical fibers $205_1$, $205_2$, ... $205_p$. Each of the transmit side optical transmission devices $103_1$, $103_2$, ... $103_N$, contain a variable delay circuit 107 having identical structures, and the desired delay time can thus be set in the respective variable delay circuits 107.

Figure 10:
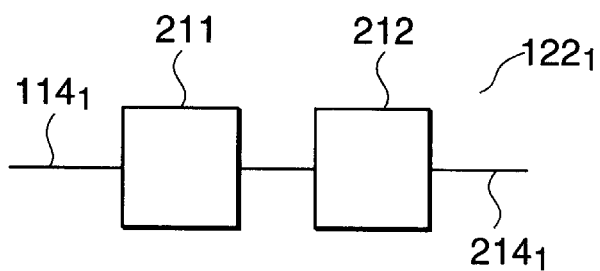
FIG. 10 is a block diagram showing a type optical interface circuit configuration in the first embodiment.
Figure 11:
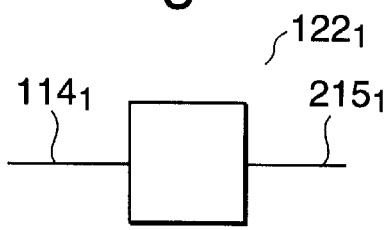
FIG. 11 is a block diagram showing another circuit configuration for the optical interface in the first embodiment.

FIG. 10 is a block diagram showing at type optical interface circuit configuration in the first embodiment. A typical configuration for an optical Interface $122_1$, is shown here but the structure of the other interfaces $122_2$, ... $122_n$ is essentially the same. The optical interface $122_1$ is comprised of an optical/electrical converter 211 to convert the optical signals $114_1$ of wavelengths $\lambda_1$ into electrical signals, and an electrical/optical converter 212 to reconvert the electrical signals into optical signals $114_1$ of a specified wavelength. The optical interface is not limited to this kind of configuration, and may also have a function for instance, to convert the optical signals $114_1$ of a specified wavelength as shown in FIG. 11 into an optical signal $215_1$ of a desired wavelength.

In the first embodiment as described above, the respective characteristic delays of transmit side optical transmission devices $103_1$, $103_2$, ... $103_N$ used in this system are extracted as previously known data, and based on this data, the phases of the overheads $152_1$, $152_2$, ... $152_N$ are controlled to have sequentially time offset positions. The previously mentioned condition, "(4) Bit pattern matches with other channel intervals." under which the non-linear optical effect was prone to occur, cannot therefore be established. As a result, the overheads $152_1$, $152_2$, ... $152_N$ can be satisfactorily reproduced on the receive side. Furthermore, addition or changes of transmit side optical transmission devices $103_1$, $103_2$, ... $103_N$ that comprise the system can easily be made.

Second Embodiment

Figure 12:
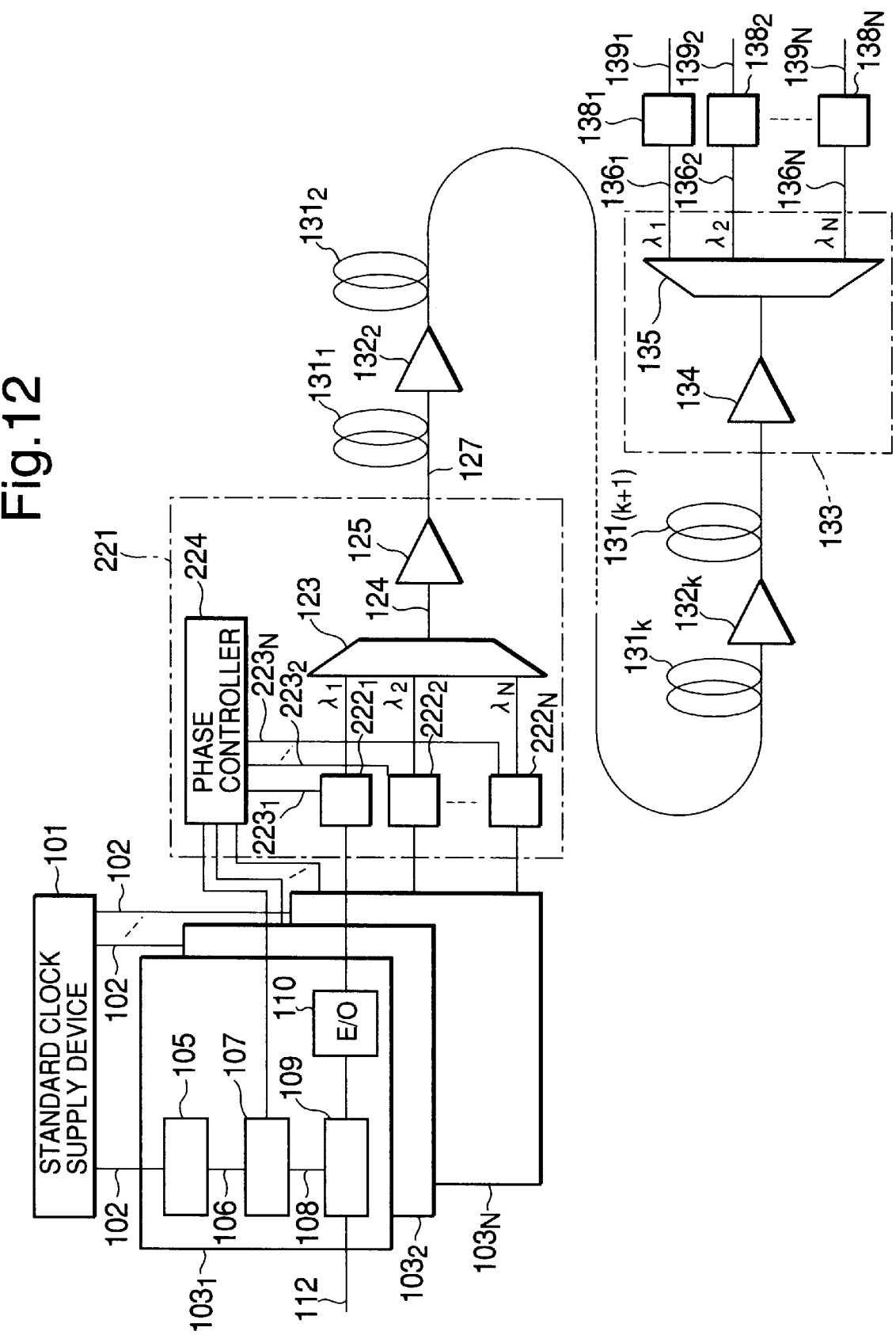
FIG. 12 is a system block diagram showing the system structure of the optical transmission system of the second embodiment of this invention.

FIG. 12 is a block diagram showing the system structure of the optical transmission system of the second embodiment of this invention. Sections of the drawing identical to the optical transmission system of FIG. 1 have the same reference numerals.

The optical transmission system of the second embodiment is comprised of one standard clock supply device 101 on the transmit side of the optical signal, a plurality of transmit side optical transmission devices $103_1$, $103_2$, ... $103_N$ respectively input with clock signals 102 of the same phase and same frequency output from the standard clock supply device 101, and a transmit side WDM device 221 input with respective separate optical signals $114_1$, $114_2$, ... $114_N$ output from an electrical/optical (E/O) converter 110. Excluding the transmit side WDM device 221, the device has a structure identical to the first embodiment.

The transmit side WDM device 221 is comprised of overhead information monitor optical interfaces $222_1$, $222_2$, ... $222_N$ to input corresponding signals from among the optical signals $114_1$, $114_2$, ... $114_N$, and a phase controller 224 to input the overhead monitor information $223_1$, $223_2$, ... $223_N$, acquired from these interfaces 222, and an optical amplifier 125 to amplify the optical signals 124 multiplexed by means of a wavelength multiplier 123 and a wavelength multiplier 123 placed on the output side of the optical interfaces $222_1$, $222_2$, ... $222_N$. A wavelength multiplexed optical signal 127 having a suitably controlled phase for bit patterns of wavelengths $\lambda_1$ ... $\lambda_N$, is output from the optical amplifier 125.

The optical signal 127 is input to the receive side WDM device 133 by way of the transmission path optical fibers $131_1$, ... $131_k$, $131_{(k+1)}$ and the optical amplifiers $132_1$, ... $132_{(k+1)}$. In the receive side WDM device 133, an optical amplifier 14 amplifies these optical signals, and a wavelength isolator 135 isolates these into the optical signals $136_1$, $136_2$, ... $136_N$ of respective wavelengths $\lambda_1$ ... $\lambda_N$. The receive side optical transmission devices $138_1$, $138_2$, ... $138_N$, receives these isolated optical signals $136_1$, $136_2$, ... $136_N$ and supplies these signals as respective bit pattern data signals $139_1$, $139_2$, ... $139_N$ to the circuit of a latter stage not shown in the drawings.

In this kind of optical transmission system of the second embodiment, a phase controller 224 detects the positions (See FIG. 4) of the overhead $152_1$, $152_2$, ... $152_N$ in the respective optical signals $114_1$, $114_2$, ... $114_N$ based on the overhead monitor information $223_1$, $223_2$, ... $223_N$, obtained from the overhead information monitor optical interfaces $222_1$, $222_2$ ... $222_N$. This embodiment differs from the first embodiment in the point that the phase control signal is sent along the control lines $141_1$, $141_2$, ... $141_N$ so that these overheads $152_1$, $152_2$, ... $152_N$ will be placed at intervals. In other words, in this optical transmission system of the second embodiment, the timing for the actual placement of each overhead $152_1$, $152_2$, ... $152_N$ is detected, and feedback control is implemented so that this becomes the desired placement.

Figure 13:
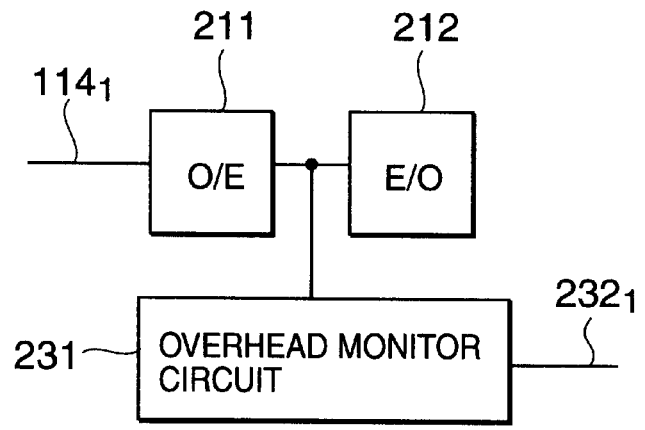
FIG. 13 is a block diagram showing the overall configuration of the overhead information monitor optical interface of the second embodiment.

FIG. 13 is a block diagram showing the overall configuration of the overhead information monitor optical interface of the second embodiment. This overhead information monitor optical interface 222 corresponds to the optical interface $122_1$ shown in FIG. 10 and section identical to FIG. 10 have the same reference numerals. In other words, the overhead information monitor optical interface 222 of this second embodiment contains an overhead monitor circuit 231 to extract the overhead $152_1$ (See FIG. 4) from the electrical signals converted in the optical/electrical converter 211. When the overhead $152_1$ is extracted, an extraction timing signal $232_1$ showing that extraction timing is supplied to the phase controller 224. The phase controller 224 is therefore supplied with the respective extraction timings $232_1$.

Figure 14:
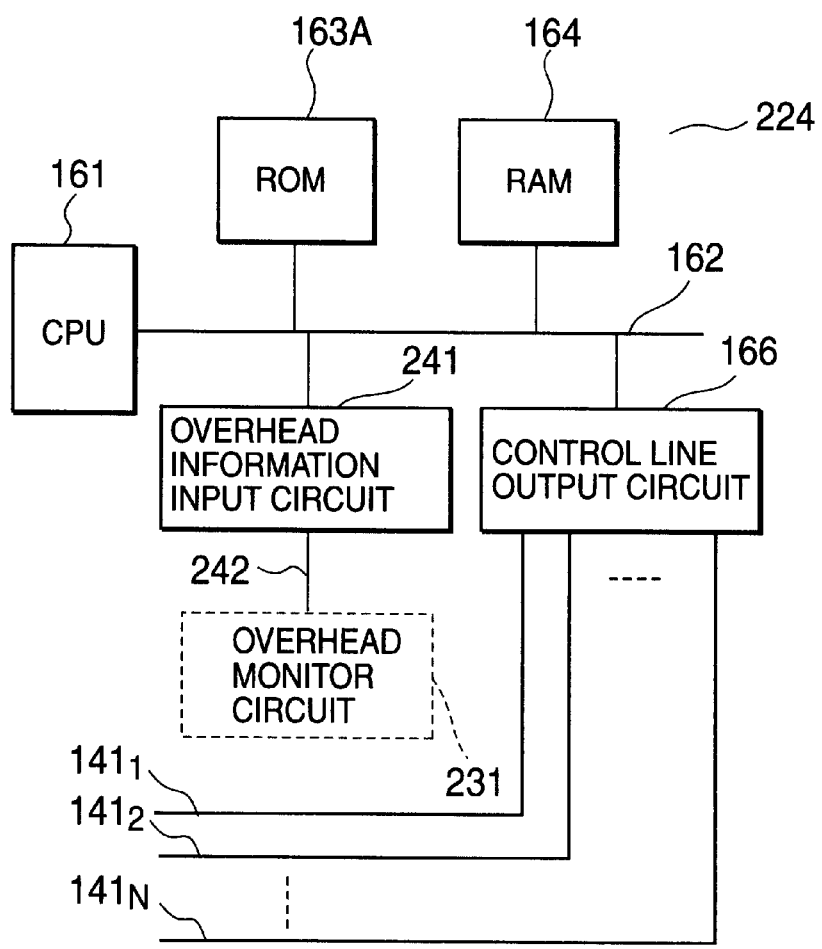
FIG. 14 is a block diagram showing the circuit configuration of the phase controller of the second embodiment.

FIG. 14 shows the circuit configuration of the phase controller and corresponds to FIG. 5 of the first embodiment. Sections in FIG. 14 identical to FIG. 5 have he same reference numerals. The phase controller 224 contains a CPU161. The CPU161 is connected to sections of the transmit side WDM device 121 (FIG. 1) by way of a bus 162 such as a data bus. Of these sections, a ROM163 is a read-only-memory for storing specified tables and a program for controlling the variable delay circuit 107 inside the transmit side optical transmission devices $103_1$, $103_2$, ... $103_N$ and the transmit side WDM device. A RAM164 is a task memory for temporarily storing data for all types of control of the CPU161. An overhead information input circuit 241 inputs overhead monitor information 242 for the transmit side optical transmission devices $103_1$, $103_2$, ... $103_N$ from the overhead monitor circuit 231 shown in FIG. 13. A control line output circuit 166 connects to the control lines $141_1$, $141_2$, ... $141_N$, and outputs a control signal for setting the delay of each of the variable delay circuits 107.

Figure 15:
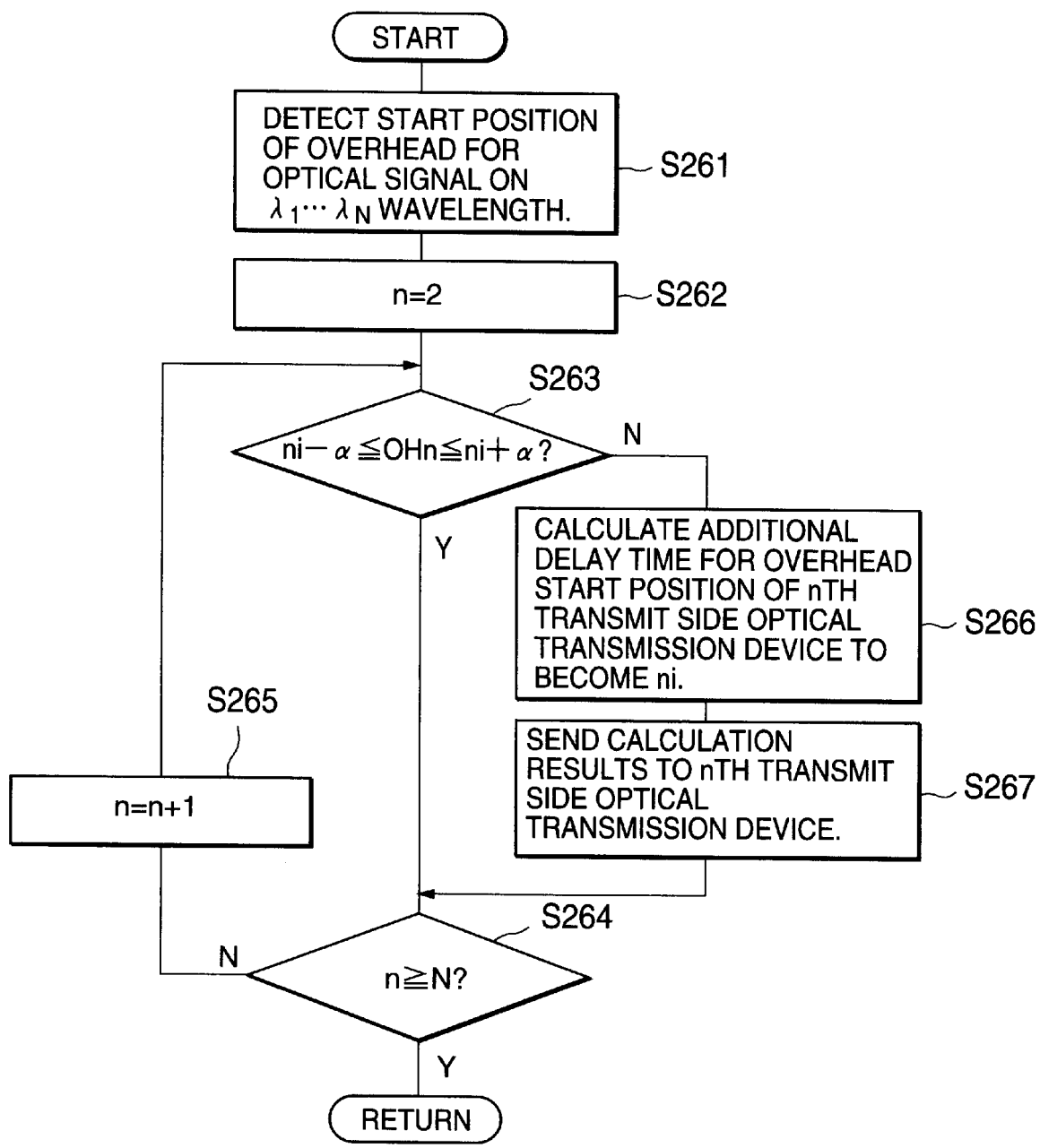
FIG. 15 is a flow chart showing the phase control process for the overhead in the phase controller.

FIG. 15 is a flow chart showing the phase control process for the overhead in the phase controller. Phase control in the second embodiment, unlike in the first embodiment can also be performed during system operation and not just at start-up of the optical transmission system. In this control, first of all, the phase controller 224 of the CPU161 acquires information relating to the start timing (step S261) for the overheads $152_1$, $152_2$, ... $152_N$, in the optical signals $114_1$, $114_2$, ... $114_N$ output from the transmit side optical transmission devices $103_1$, $103_2$, ... $103_N$, from the overhead information input circuit 241.

Next, the CPU161 resets (initializes) the specified parameter n, setting a "2" (step 262), and checks whether or not, the second optical signal $114_2$ in the time interval $OH_2$ from the frame start position to the start position $S_2$ (See FIG. 8) of the overhead $152_2$ fits within the specified allowable range (±α) (step 263).

The start position $S_2$ of the second overhead $152_2$ represents a potential problem. Ideally a start position $S_2$ for the overhead $152_2$, is a time point ni from the generation of the frame pulse 151 of FIG. 8, or in other words is a time point delayed just by 2i. A check is therefore made in step S263 to find if the following equation (1) is satisfied.

$$2i-\alpha \leq OH_2 \leq 2i+\alpha \qquad (1)$$

If the start position $S_2$ for the second overhead $152_2$ satisfies this condition (step S263: Y), then a check is made as to whether the current parameter "n" has now become "N" or higher (step S264). This check is made to determine if phase adjustment is finished for each of the transmit side optical transmission devices $103_2$, ... $103_N$. When transmit side optical transmission devices $10_{3N}$ remain that still require phase adjustment, (or N), the parameter "n" increases by one increment (step S265), and the same process starts again for the overhead $152_3$.

On the other hand when, in step S263 the start position $S_2$ for the second overhead $152_2$ is not within allowable range (N), then an additional delay time is calculated (step S266) so that the start position $S_2$ for the second overhead $152_2$ (of second transmit side optical transmission device $103_2$) will be 2i from the issue of the frame synchronizing pulse 151. These calculated results are then sent to the variable delay circuit 107 of the second transmit side optical transmission device $103_2$ (step S207). The variable delay circuit 107 of the second transmit side optical transmission device $103_2$ thus sets this additional delay time, and as a result, the overhead $152_2$ of the second transmit side optical transmission device $103_2$ starts from the second start position $S_2$ of FIG. 8. The structure of the variable delay circuit 107 may be identical to the previous embodiment (See FIG. 9).

When the processing up to the overhead $152_2$ of the Nth transmit side optical transmission device $103_N$ ends in this way (step S264:Y), the CPU161 starts the processing again from step 261 at the time assigned to the next overhead processing. In this way, the phase adjustment for the remaining overheads $152_2$, ... $152_N$ is consecutively performed from the specified start position, based on the start position of overhead $152_1$ of the first transmit side optical transmission device $103_1$.

In the above described optical transmission system of the second embodiment, the phase of each remaining overheads $152_2$, ... $152_N$ is performed based on the $152_1$ start position. A simpler circuit can therefore be used since there is no need to detect the timing of the frame synchronizing pulse 151 on the transmit side WDM device 221 end.

Third Embodiment

Figure 16:
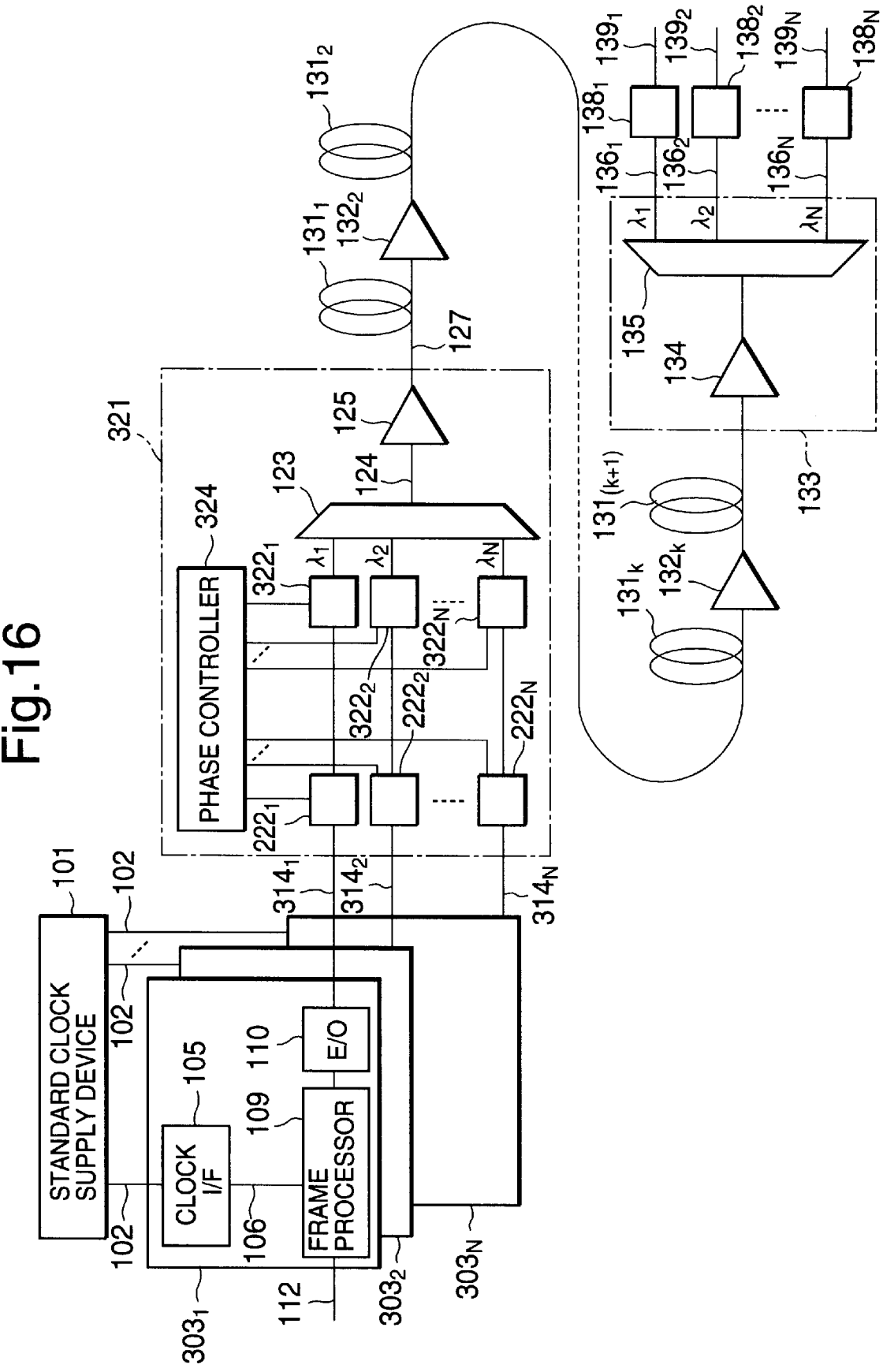
FIG. 16 is a system block diagram showing the structure of the optical transmission system of the third embodiment of this invention.

FIG. 16 is a system block diagram showing the structure of the optical transmission system of the third embodiment of this invention. Sections in Sections in FIG. 16 identical to optical transmission systems in the third embodiment shown in FIG. 1 and FIG. 12 have the same reference numerals.

The optical transmission system of the third embodiment is comprised of one standard clock supply device 101 on the transmit side of the optical signal, a plurality of transmit side optical transmission devices $303_1$, $303_2$, ... $303_N$ respectively input with clock signals 102 of the same phase and same frequency output from the standard clock supply device 101, and a transmit side WDM device 321 input with respective separate optical signals $314_1$, $314_2$, ... $314_N$ output from an electrical/optical (E/O) converter 110 for the transmit side optical transmission devices $303_1$, $303_2$, ... $303_N$.

The transmit side optical transmission devices $303_1$, $303_2$, ... $303_N$ referred to here are comprised of a clock interface (clock I/F) 105, a frame processor 109 input with frame pulses 106 output from the clock interface 105, and an (E/O) converter 110.

The clock interface 105 is a circuit that converts the clock signals 102 supplied from the standard clock supply device 101 to clock frequency signals corresponding to the internal configuration of its own transmit side optical transmission device $103_1$, and is comprised of frequency dividers not shown in the drawing. The frame processor 109 processes data signals 112 input from external sources by using the frame pulses 108, and generates a frame format. The electrical signals from the frame format that was generated are input to the electrical/optical (E/O) converter 110, and converted into optical signal $314_1$. In the same way, data signals input respectively from other $303_2$, ... $303_N$ not shown in the drawing are processed, and the results converted to optical signals $314_2$, ... $319_N$ and output.

The transmit side WDM device 321 is comprised of overhead information monitor interfaces $222_1$, $222_2$, ... $222_N$ input with corresponding signals from among the optical signals $314_1$, $314_2$, ... $314_N$ and, a phase controller 324 input with overhead information monitor information signals $223_1$, $223_2$, ... $223_N$ acquired from overhead information monitor interfaces $222_1$, $222_2$, ... $222_N$, optical variable delay circuits $322_1$, $322_2$, $322_N$ placed on the output side of the overhead information monitor interfaces $222_1$, $222_2$, ... $222_N$, a wavelength multiplexer 123 to wavelength multiplex optical signals of wavelengths $\lambda_1$ ... $\lambda_N$ output from these optical variable delay circuits $322_1$, $322_2$, ... $322_N$, as well as an optical amplifier 125 to amplify 10 the output signals 124 multiplexed by the wavelength multiplexer 123. A wavelength multiplexed optical signal 127 with a respective appropriately controlled phase for wavelengths $\lambda_1$ ... $\lambda_N$ of the respective bit patterns is output from the optical amplifier 125.

The optical signal 127 is input to the receive side WDM device 133 by way of the transmission path optical fibers $132_1$, ... $132_k$, $132_{(k+1)}$ and the optical amplifiers $132_1$, ... $132_{(k+1)}$. In the receive side WDM device 133, an optical amplifier 134 amplifies these optical signals, and a wavelength isolator 135 isolates these respectively into optical signals $136_1$, $136_2$, ... $136_N$ for respective wavelengths $\lambda_1$ ... $\lambda_N$. The receive side optical transmission devices $138_1$, $138_2$, ... $138_N$, receive these isolated optical signals $136_1$, $136_2$, ... $136_N$ and supply these signals as respective bit pattern data signals $139_1$, $139_2$, ... $139_N$ to the circuit of a latter stage not shown in the drawings.

Figure 17:
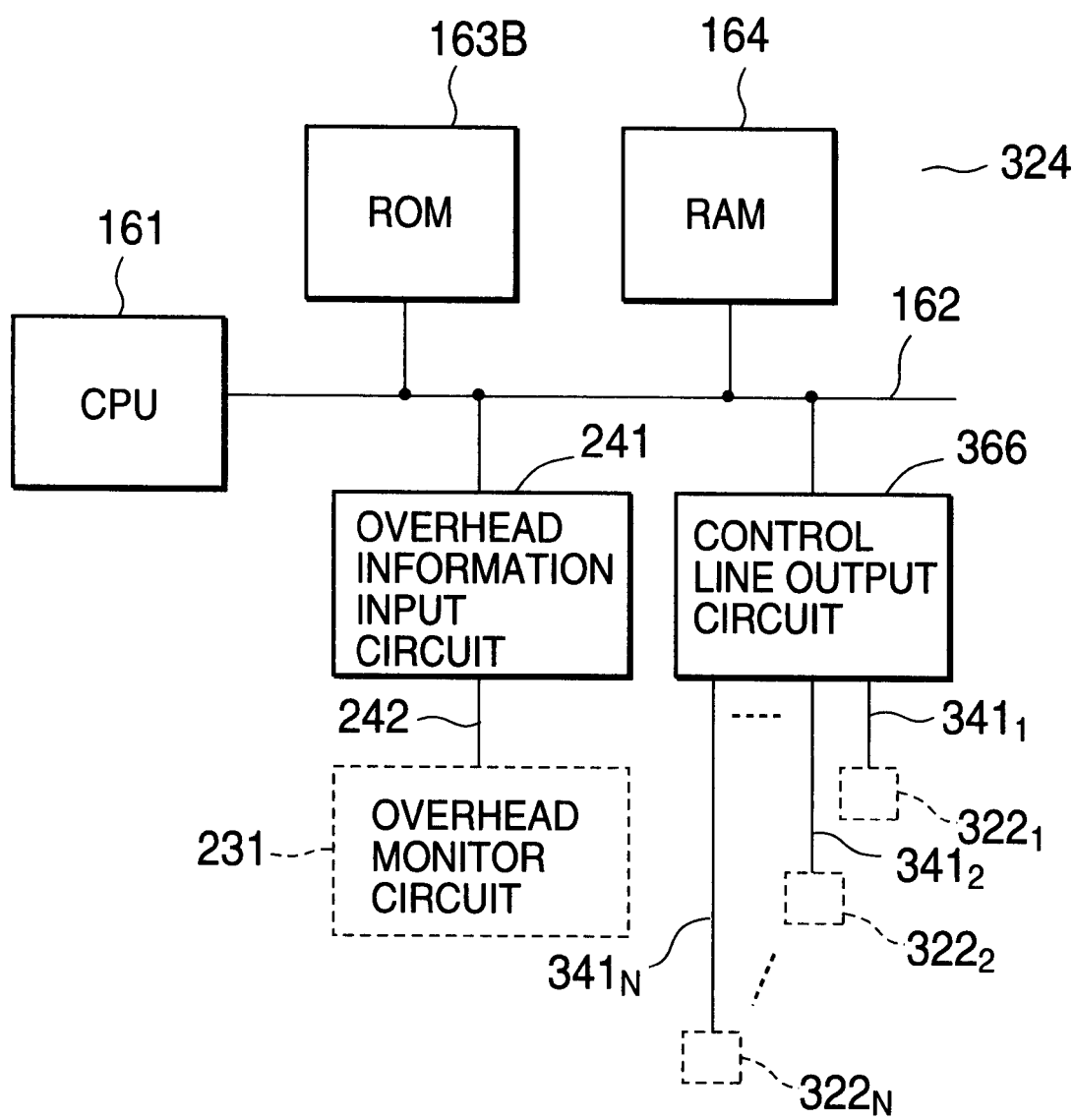
FIG. 17 is a block diagram showing the structure of the phase controller used in the optical transmission system of the third embodiment.

FIG. 17 is a block diagram showing the structure of the phase controller used in the optical transmission system of the third embodiment. Sections in FIG. 17 identical to FIG.

14 of the second embodiment have the same reference numerals, and their description is omitted.

The phase controller 324 of this embodiment, instead of to the control line output circuit 166 of the second embodiment, connects a control line output circuit 366 to a bus 162. This control line output circuit 366 is connected by way of the control lines $341_1, 341_2, \ldots 341_N$, to the optical variable delay circuits $322_1, 322_2, \ldots 322_N$, shown in FIG. 16, and the setting of the delay time on optical variable delay circuits $322_1, 322_2, \ldots 322_N$ is performed by way of these control lines.

Figure 18:
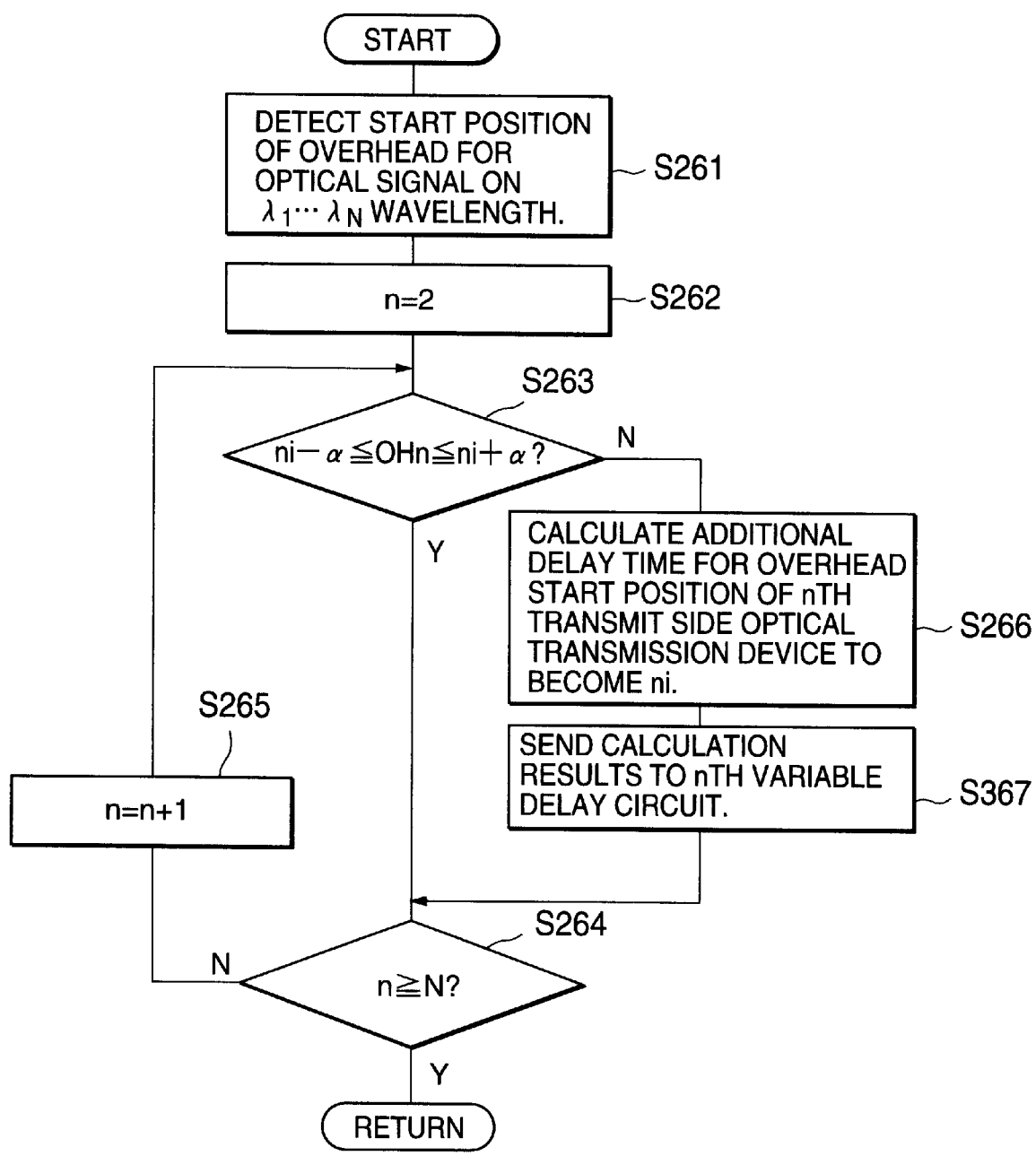
FIG. 18 is a flow chart showing the overhead phase control process in the phase controller of the third embodiment.

FIG. 18 is a flow chart showing the overhead phase control status by the phase controller. In this kind of phase control in the third embodiment, the processing of step S26 of the second embodiment, is changed to step S367 by means of the program stored in the ROM163B (FIG. 17). In step S367, the calculated results for the additional delay time found in step S2606 are sent to the variable delay circuit $322_n$ of the nth transmit side optical device $103_n$. As a result, the overhead $152_n$ starts from the second start position $S_n$ of FIG. 8.

In the optical transmission system of the third embodiment as described above, phase control of the overhead on the transmit side WDM device 321 is performed by adjustment of the delay time of each optical signal. The structure of the transmit side optical transmission devices $303_1, 303_2, \ldots 303_N$, and also the wiring between each device $303_N$ and the transmit side WDM device 321 is therefore simpler than in the first embodiment and the second embodiment.

Fourth Embodiment

Figure 19:
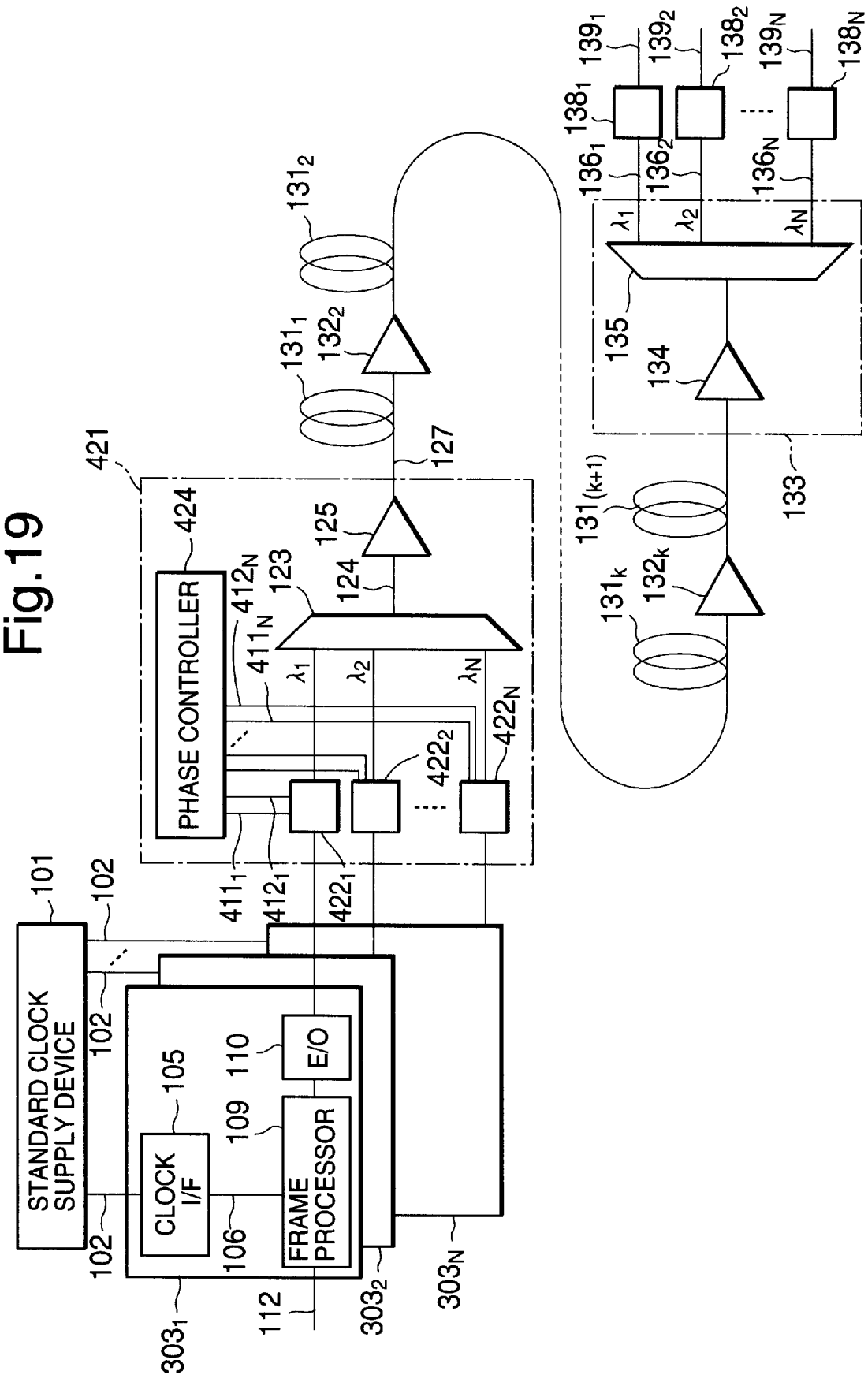
FIG. 19 is a system block diagram showing the optical transmission system of the fourth embodiment of this invention.

FIG. 19 is a system block diagram showing the optical transmission system of the fourth embodiment of this invention. Sections in this fourth embodiment identical to the optical transmission system FIG. 1 and FIG. 16 have the same reference numerals.

The optical transmission system of the fourth embodiment is comprised of one standard clock supply device 101 on the transmit side of the optical signal, a plurality of transmit side optical transmission devices $303_1, 303_2, \ldots 303_N$ respectively input with clock signals 102 of the same phase and same frequency output from the standard clock supply device 101, and a transmit side WDM device 321 input with respective separate optical signals $314_1, 314_2, \ldots 314_N$ output from an electrical/optical (E/O) converter 110 of the transmit side optical transmission devices $303_1, 303_2, \ldots 303_N$. Circuit sections other than the transmit side WDM device 321 are identical to the optical transmission system of the third embodiment so a description is omitted here.

The transmit side WDM device 421 contains first through Nth overhead information monitor optical interfaces $422_1, 422_2, \ldots 422_N$ input with corresponding optical signals $314_1, 314_2, \ldots 314_N$, output from an electrical/optical (E/O) converter 110. These overhead information monitor optical interfaces $422_1, 422_2, \ldots 422_N$ are configured to monitor information $411_1, 411_2, \ldots 411_N$ showing the respective timing for overhead information, to the phase controller 424. The phase controller 424 performs calculation (processing) required for phase control, and inputs the calculation results as delay control signals $412_1, 412_2, \ldots 412$ to the respective corresponding points of the first through Nth overhead information monitor optical interfaces $422_1, 422_2, \ldots 422_N$, and adjusts the phase.

The optical signals of wavelengths $\lambda_1 \ldots \lambda_N$ adjusted in this way, are input to the wavelength multiplexer 123 and become multiplexed optical signals 124. These multiplexed optical signals 124 are amplified in an optical amplifier 125. As a result, a wavelength multiplexed optical signal 127 having a suitably controlled phase for bit patterns of wavelengths $\lambda_1 \ldots \lambda_N$, is output from the optical amplifier 125.

The optical signal 127 is input to the receive side WDM device 133 by way of the transmission path optical fibers $131_1, \ldots 131_k, 131_{(k+1)}$ and the optical amplifiers $132_1, \ldots 132_k$. In the receive side WDM device 133, an optical amplifier 134 amplifies the optical signal, and a wavelength isolator 135 isolates it into the optical signals $136_1, 136_2, \ldots 136_N$ of respective wavelengths $\lambda_1 \ldots \lambda_N$. The receive side optical transmission devices $138_1, 138_2, \ldots 138_N$, receive these isolated optical signals $136_1, 136_2, \ldots 136_N$ and supplies these signals as respective bit pattern data signals $139_1, 139_2, \ldots 139_N$ to the circuit of a latter stage not shown in the drawings.

Figure 20:
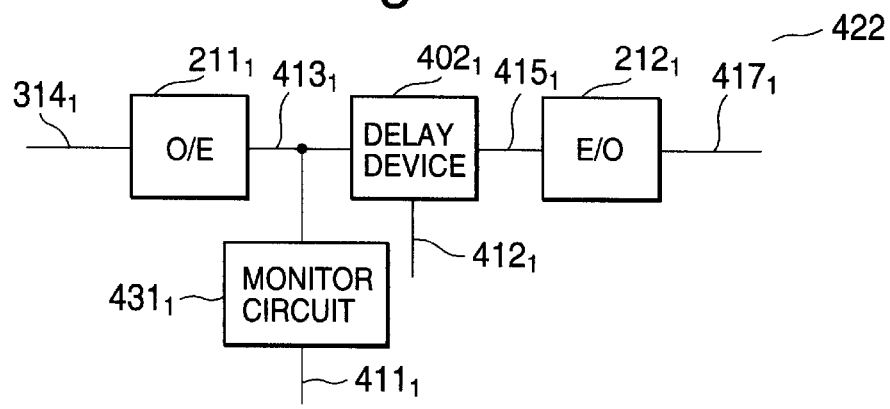
FIG. 20 is a block diagram showing the circuit configuration as the first overhead information monitor interface used in the fourth embodiment.

FIG. 20 is a block diagram showing the circuit configuration as the first overhead information monitor interface used in the fourth embodiment. The circuit configuration of the second through Nth overhead information monitor interfaces $422_2, \ldots 422_N$, are identical to the first overhead information monitor interfaces 422 so their description is omitted.

A first overhead information monitor optical interface $422_1$ is comprised of an optical/electrical (O/E) converter $211_1$ input with optical signals $314_1$ of wavelengths $\lambda_1$, a monitor circuit $431_1$ to monitor overhead information in the electrical signal $413_1$ obtained from the optical/electrical converter $211_1$, a delay device $402_1$ to input this electrical signal $413_1$, and provide a suitable delay as required by this electrical signal $413_1$, and an electrical/optical converter (E/O) $212_1$ to Ifnput the delay-processed electrical signal $415_1$ and reconvert this electrical signal $415_1$ into an optical signal $417_1$. Monitor information $411_1$ is output from a monitor circuit $431_1$. A suitable type of electrical signal delay device can be selected as the delay device $402_1$.

Figure 21:
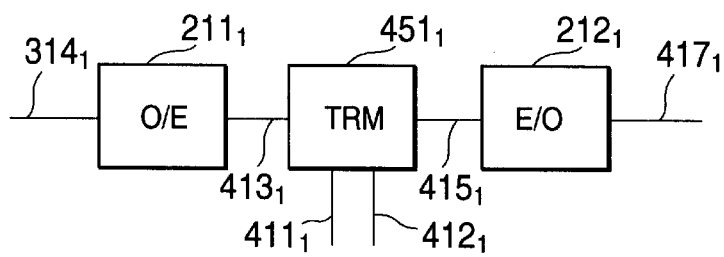
FIG. 21 is a block diagram showing another possible circuit configuration as the first overhead information monitor interface used in the fourth embodiment.

FIG. 21 is a block diagram showing another possible circuit configurations the first overhead information monitor interface used in the fourth embodiment. In this variation, the electrical signal $413_1$ converted in the optical/electrical converter $211_1$ is input to an overhead termination circuit $451_1$ in order to terminate the overhead. The delay-processed electrical signal $452_1$ is supplied to the electrical/optical converter $212_1$. By providing an overhead terminating function in this way, by means of an overhead termination circuit $451_1$ between the optical/electrical (O/E) converter $211_1$ and electrical/optical converter (E/O) $212_1$, section overheads such as for SDH (synchronous digital hierarchy) or SONET (synchronous optical network) can be terminated. Along with being able to output the monitor information $411_1$ for the overhead, the delay control signal $412_1$ is input and the frame phase set, or in other words, the start position for the overhead can be set.

Figure 22:
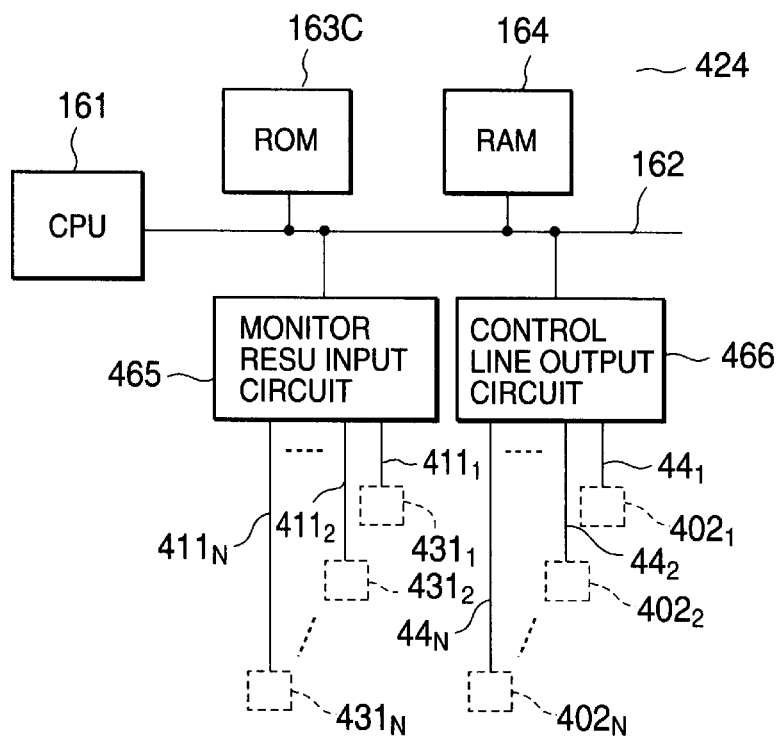
FIG. 22 is a block diagram showing the configuration of the phase controller used in the optical transmission system of the fourth embodiment.

FIG. 22 is a block diagram showing the configuration of the phase controller used in the optical transmission system of the fourth embodiment. In FIG. 22 sections identical to FIG. 14 of the second embodiment have the same reference numerals, and their explanation is omitted here.

In the phase controller 424 of this embodiment, instead of the overhead information input circuit 241 of the second embodiment, a monitor effect input circuit 405 is connected to a bus 162, and instead of the control line output circuit, a control line output circuit 466 is connected to the bus 162. The monitor effect input circuit 465 is input with monitor information $411_1, 411_2, \ldots 411_N$ from the monitor circuits monitor information $431_1, 431_2, \ldots 431_N$, corresponding to the respective overhead information monitor optical interfaces $422_1, 422_2, \ldots 422_N$ shown in FIG. 19. Also, the control line output circuit 466 is connected by the control lines $441_1, 441_2, \ldots 441_N$ to the first through Nth overhead information monitor optical interfaces $422_1, 422_2, \ldots 422_N$. The calculation results for phase control are thus sent as the delay control signals $412_1, 412_2, \ldots 412_N$ to the respective corresponding delay devices $402_{11}, 402_2, \ldots 402_1$ by way of these control lines and interfaces.

Figure 23:
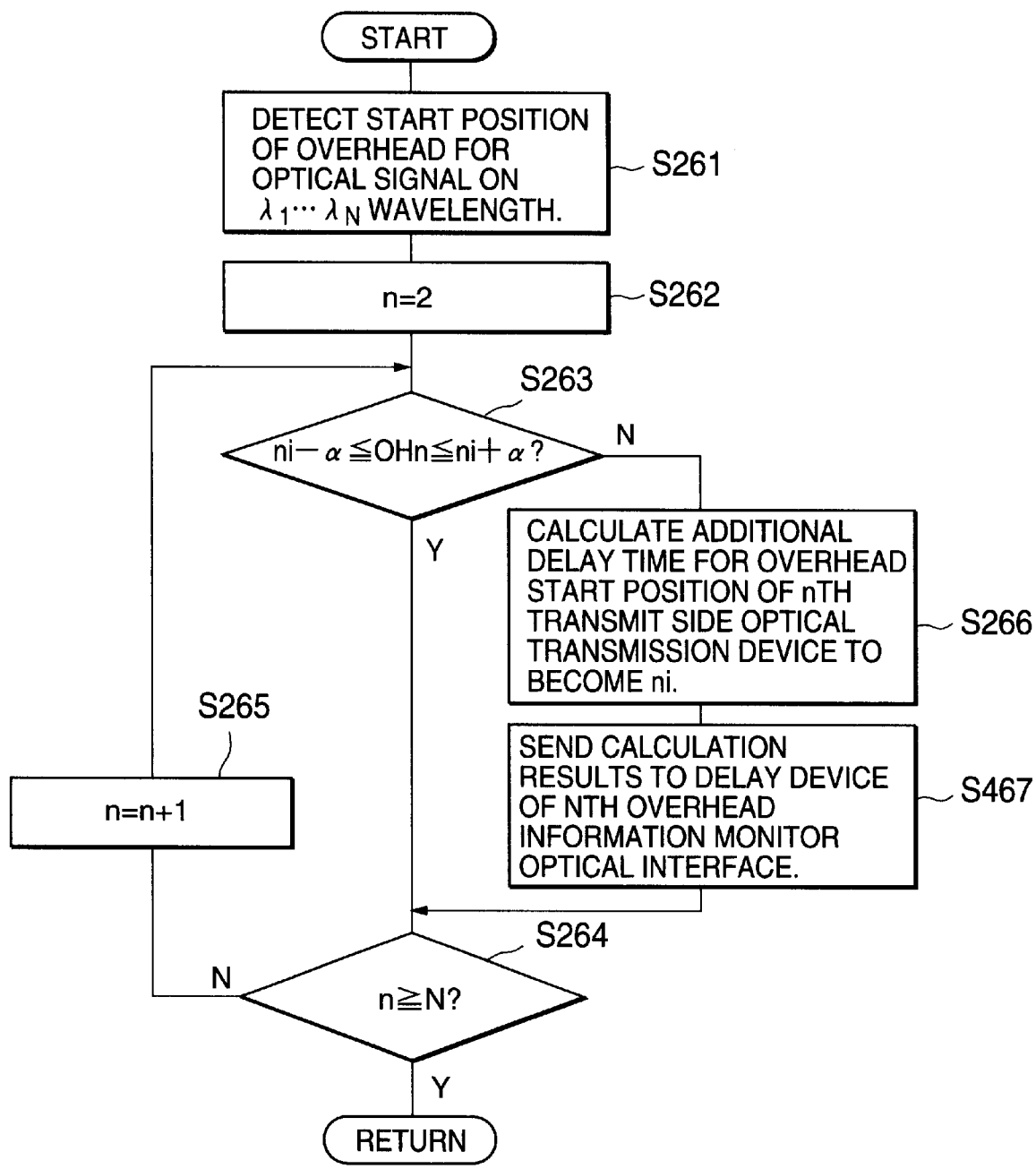
FIG. 23 is a flow chart showing the phase control process for the overhead by the phase controller of the fourth embodiment.

FIG. 23 is a flow chart showing the phase control process the overhead by the phase controller. In this kind of phase control in the fourth embodiment, the processing of step S267 of the second embodiment, is changed to step S467 by means of the program stored in the ROM163D (FIG. 22). In step S467, the calculated results for the additional delay time found in step S266 are sent to the delay device $402_N$ of the Nth overhead information monitor optical interfaces $422_N$. As a result, the overhead $152_N$ starts from the second start position $S_N$ of FIG. 8.

In the optical transmission system of the fourth embodiment as described above, an overhead information monitor optical interface $422_N$ was installed on the transmit side WDM device 421, and both acquisition of overhead information and the setting of a delay amount for chase control of the overhead were performed. Therefore, just the same as in the third embodiment, the structure of the transmit side optical transmission devices $303_1, 303_2, \ldots 303_N$ and also the wiring between these devices $303_N$ and the transmit side WDM device 321 can not only therefore be made simpler than in the first embodiment and the second embodiment, but a large reduction in the cost of structural parts for the transmit side WDM device 421 can also be achieved.

Fifth Embodiment

Figure 24:
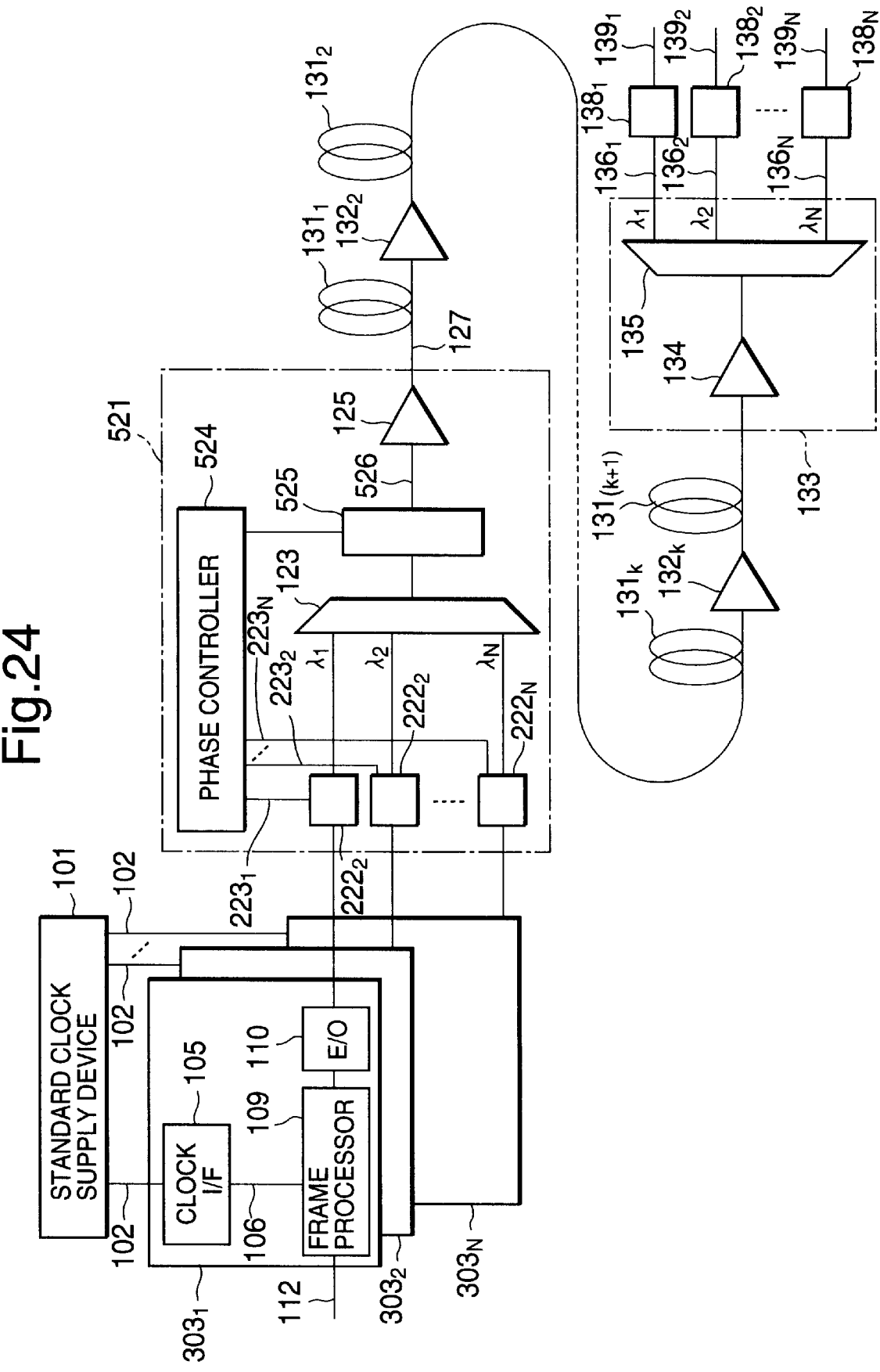
FIG. 24 is a system block diagram showing the structure of the optical transmission system of the fifth embodiment of this invention.

FIG. 24 is a system block diagram showing the structure of the optical transmission system of the fifth embodiment of this invention. In FIG. 24 sections identical to the optical transmission system in FIG. 1 and FIG. 16 of the second embodiment have the same reference numerals.

The optical transmission system of the fifth embodiment is comprised of one standard clock supply device 101 on the transmit side of the optical signal, a plurality of transmit side optical transmission devices $303_1, 303_2, \ldots 303_N$ respectively input with clock signals 102 of the same phase and same frequency output from the standard clock supply device 101, and a transmit side WDM device 521 input with respective separate optical signals $314_1, 314_2, \ldots 314_N$ output from an electrical/optical (E/O) converter 110 for the transmit side optical transmission devices $303_1, 303_2, \ldots 303_N$. Circuit sections other than the transmit side WDM device 521 are identical to the optical transmission system of the third and fourth embodiments so a description is omitted here.

The transmit side WDM device 521 contains overhead information monitor optical interfaces $222_1, 222_2, \ldots 222_N$ (See FIG. 16) input with correspond ng optical signals $314_1, 314_2, \ldots 314_N$, output from an electrical/optical (E/O) converter 110, a phase controller 524 input with overhead information monitor information signals $223_1, 223_{12}, \ldots 223_N$ acquired from these overhead information monitor interfaces $222_1, 222_2, \ldots 222_N$ a wavelength multiplexer 123 installed on the output side of the overhead information monitor interfaces $222_1, 222_2, \ldots 222_N$ to wavelength multiplex the optical signals of wavelengths $\lambda_1 \ldots \lambda_N$, a macro dispersion fiber selector 525 installed on the output side of the wavelength multiplexer 123, and an optical amplifier 125 to amplify the optical signals 526 after dispersion in this macro dispersion fiber selector 525. A wavelength multiplexed optical signal 127 with an appropriately controlled phase for wavelengths $\lambda_1 \ldots \lambda_N$ of the respective bit patterns is output from the optical amplifier 125.

The optical signal 127 is input to the receive side WDM device 133 by way of the transmission path optical fibers $132_1, \ldots 132_{(k+1)}$ and the optical amplifiers $132_1, \ldots 325_k$. In the receive side WDM device 133, an optical amplifier 134 is input with and amplifies these optical signals, and a wavelength isolator 135 isolates these signals respectively into the optical signals $136_1, 136_2, \ldots 136_N$ for respective wavelengths $\lambda_1 \ldots \lambda_N$. The receive side optical transmission devices $138_1, 138_2, \ldots 138_N$, receive these isolated optical signals $136_1, 136_2, \ldots 136_N$ and supply these signals as respective bit pattern data signals $139_1, 139_2, \ldots 139_N$ to the circuit of a latter stage not shown in the drawings.

Figure 25:
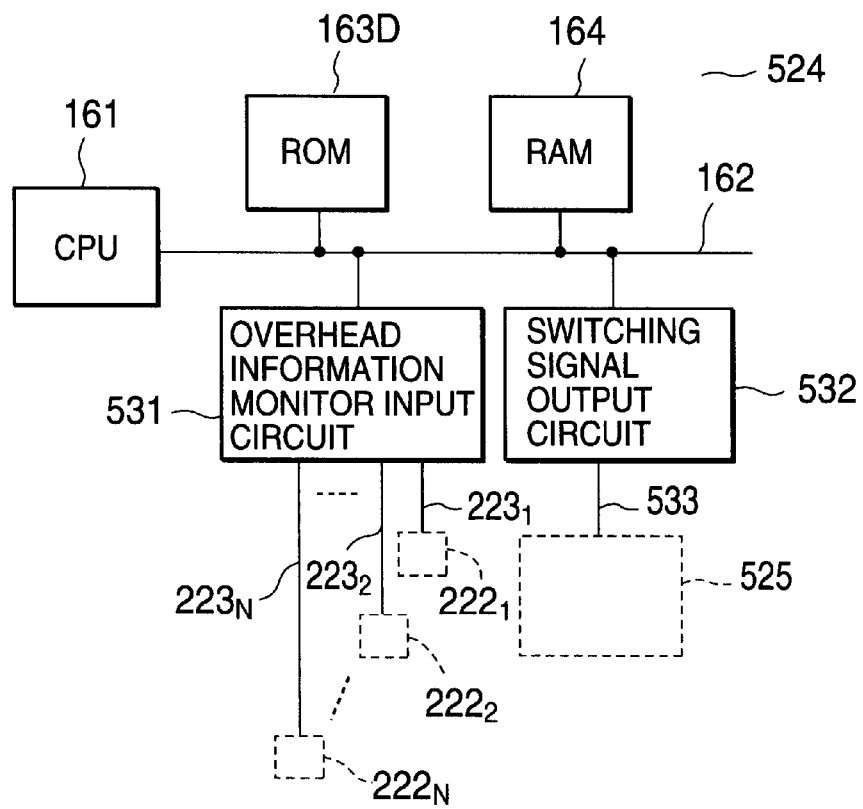
FIG. 25 is a block diagram showing the phase controller used in the optical transmission system of the fifth embodiment of this invention.

FIG. 25 is a block diagram showing the structure of the phase controller. In the phase controller 524, a CPU163 is connected to a bus 162, and a ROM163 and RAM164 as well as an overhead information monitor information input circuit 531 and a switching signal output circuit 532 are also connected to the bus 162. The overhead information monitor information $223_1, 223_2, \ldots 223_N$ from the overhead information monitor interfaces $222_1, 222_2, \ldots 222_N$, shown in FIG. 24, is input to the overhead information monitor input circuit 531. A switching signal 533 is supplied to the macro dispersion optical fiber selector 525 from the switching signal output circuit 532.

Figure 26:
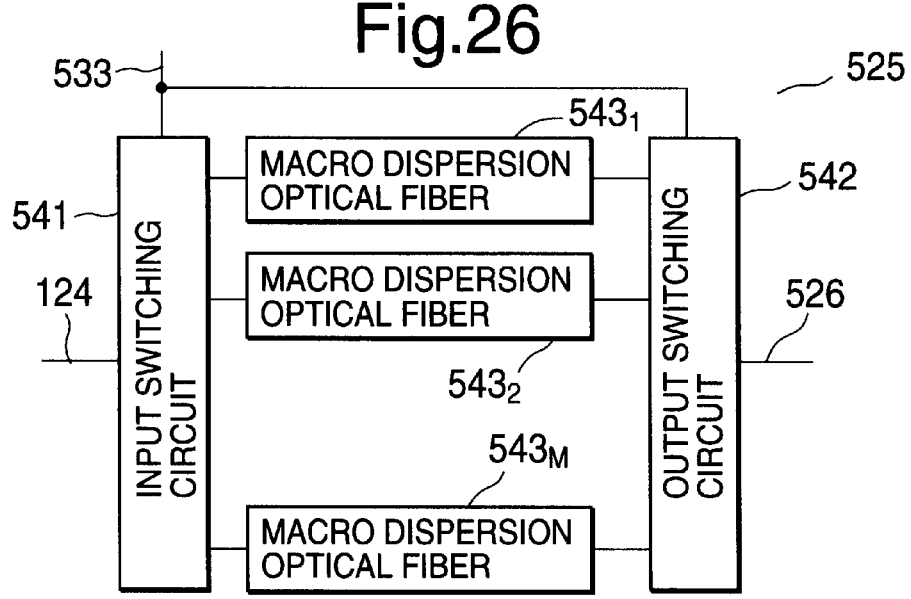
FIG. 26 is a block diagram showing the macro-fiber selector of the fifth embodiment.

FIG. 26 is a block diagram showing the macro-fiber selector of the fifth embodiment. The macro dispersion optical fiber selector 525 is comprised of an input side switch circuit 541 to input an optical signal 124 multiplexed by the wavelength multiplexer 123 shown in FIG. 24, an output side switch circuit 542 to output an optical signal 526 to an optical amplifier shown in FIG. 24, and a first through Mth macro-dispersion fibers $543_1, 543_M$, connected in parallel between the switch circuits 541 and 542. The numerical value, "M" here, is an optional value of 2 or more and the higher this value, the more types of phase adjustment that can be handled. There is therefore no need to make number "M" identical to the number "N". The switching signal 533 is jointly supplied to the input and output switch circuits 541 and 542. One macro-dispersion fiber from among the first through Mth macro-dispersion fibers $543_1, \ldots 543_M$ is selected according to the contents of this switching signal 533.

As the macro-dispersion fibers $543_1, \ldots 543_M$ this embodiment uses fibers having a high dispersion value on a wavelength band, such as normal fibers for optical signals on a wavelength of 1550 nm, in other words dispersion compensating fiber and single mode fiber near a zero dispersion wavelength of 1310 nm. As reference information, Of these macro-dispersion fibers, the normal fibers are approximately 18 ps/nm per 1 kilometer and the dispersion compensating fibers are −50 ps/nm per kilometer.

A difference in delay times that varies with the optical signal wavelength, occurs when optical signals of mutually different wavelengths $\lambda_1 \ldots \lambda_N$, and also having different overhead start positions, pass through these first through Mth macro-dispersion fibers $543_1, \ldots 543_M$. The phase relation of the multiplexed optical signals 124 on wavelengths $\lambda_1 \ldots \lambda_N$ input to the output switch circuits 542 therefore undergo mutual fluctuations. Therefore, when fibers having mutually different propagation delay times on the wavelengths $\lambda_1 \ldots \lambda_N$, are used as the first through Mth macro-dispersion fibers $543_1, \ldots 543_M$, if one optimal fiber is selected according to phase of each overhead of the wavelength multiplexed signal that was actually input, then the non-linear optical effect can be suppressed without using a delay device.

Figure 27:
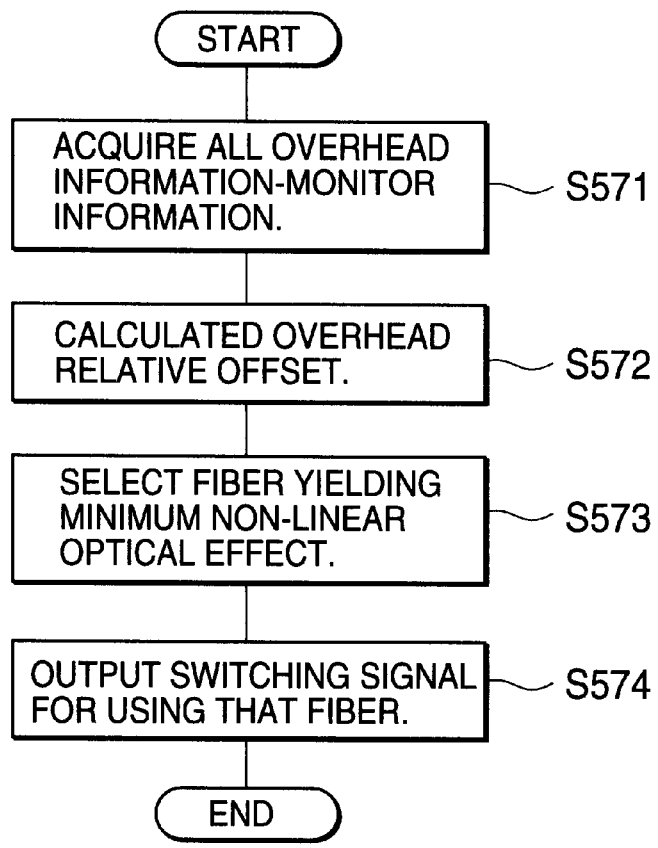
FIG. 27 is a flow chart showing the phase control process for the overhead by the phase controller of the fifth embodiment.

FIG. 27 is a flow chart showing the phase control process for the overhead by the phase controller. In phase control in the fifth embodiment, The CPU161 is input (step S571) with overhead information monitor information $223_1, 223_2, \ldots 223_N$ from the overhead information monitor input circuit 531 based on the program stored in the ROM163D. The relative offset (or deviation) per that input, in the start of overheads $152_1, 152_2, \ldots 152_N$, on each wavelength $\lambda_1 \ldots \lambda_N$, is then calculated (step S572). This calculation is required because of the offset (or deviation) occurring at the start of overheads $152_1, 152_2, \ldots 152_N$ due to individual differences in transmit side optical transmission devices $303_1, 303_2, \ldots 303_N$ as related previously.

The CPU161 searches the macro dispersion fiber selection table (not shown in drawing) stored in the ROM163, and selects (step S573) the macro dispersion fiber 53 having the smallest non-linear optical effect versus this phase offset (deviation), from among the M macro-dispersion fibers $543_1, \ldots 543_M$. A switch signal 533 for selecting this macro dispersion fiber $543_M$, is then supplied to the first and the second switch circuits 541 and 542 (step S574). The switch circuits 541 and 542 for the input and output thus select the specified macro dispersion fiber $543_M$ and output from the macro-dispersion optical fiber selector 525, an optical signal 526 in which the non-linear optical effect has been effectively suppressed.

Variations of the Invention Variations of the invention are hereafter described in detail. In the previously described fifth embodiment for example, a macro dispersion fiber $543_M$ was selected to minimize the non-linear optical effect. However by finding the degree of importance (or criticality) of each optical signal and exchanging the criticality data on the optical signal wavelength being used, a macro dispersion fiber $543_M$ can be selected that more effectively reduces the non-linear optical effect.

Figure 28:
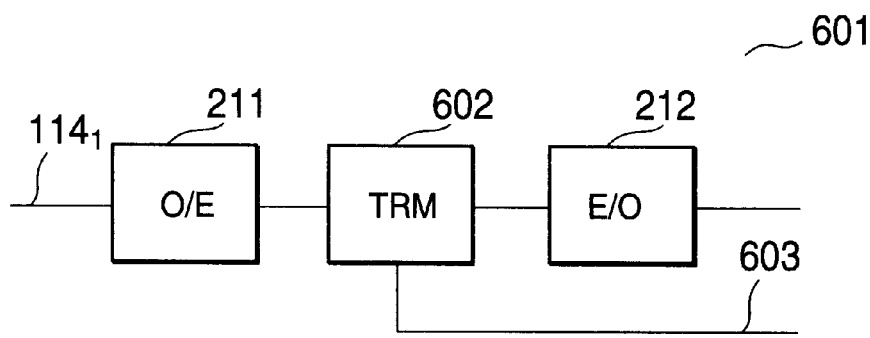
FIG. 28 is a block diagram showing a variation of the optical interface with overhead information monitor used in the second embodiment.
Figure 29:
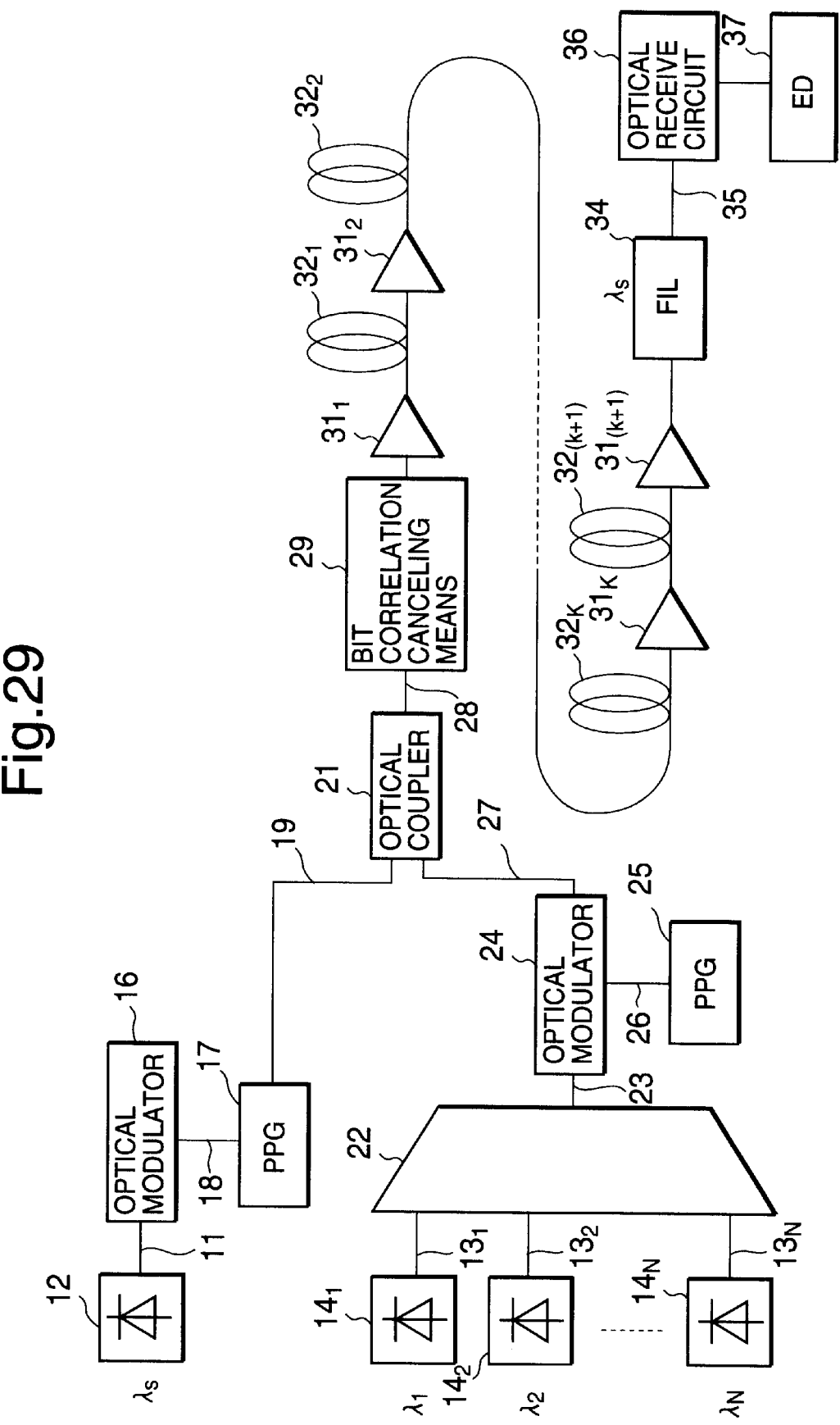
FIG. 29 is a block diagram of an experimental optical transmission system showing the non-linear optical effect due to phase-matching of the bits.
Figure 30:
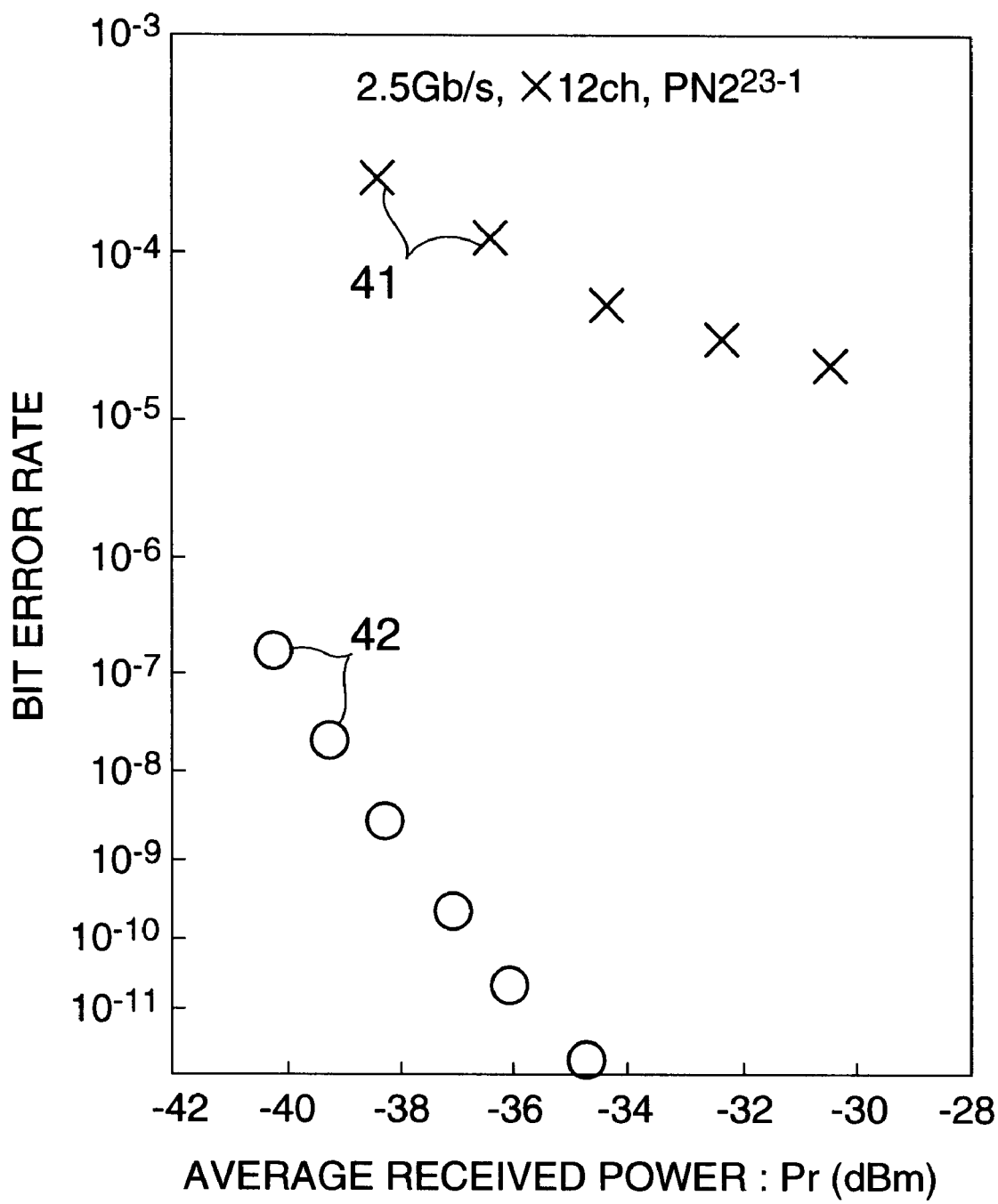
FIG. 30 is a diagram of a characteristic curve showing the coding error rate versus the received light level during reception in the system of FIG. 29.
Figure 31:
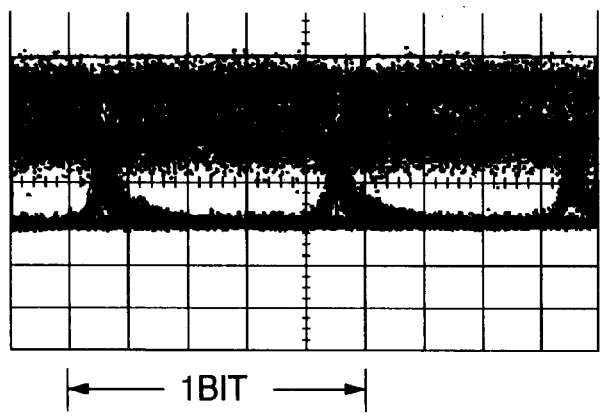
FIG. 31 is a waveform showing the received light waveform when bit-matching is performed, and the bit correlation canceling shown in FIG. 29 is off.
Figure 32:
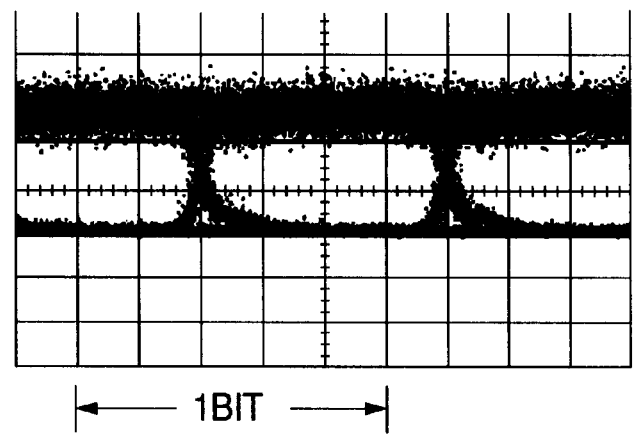
Figure 33:
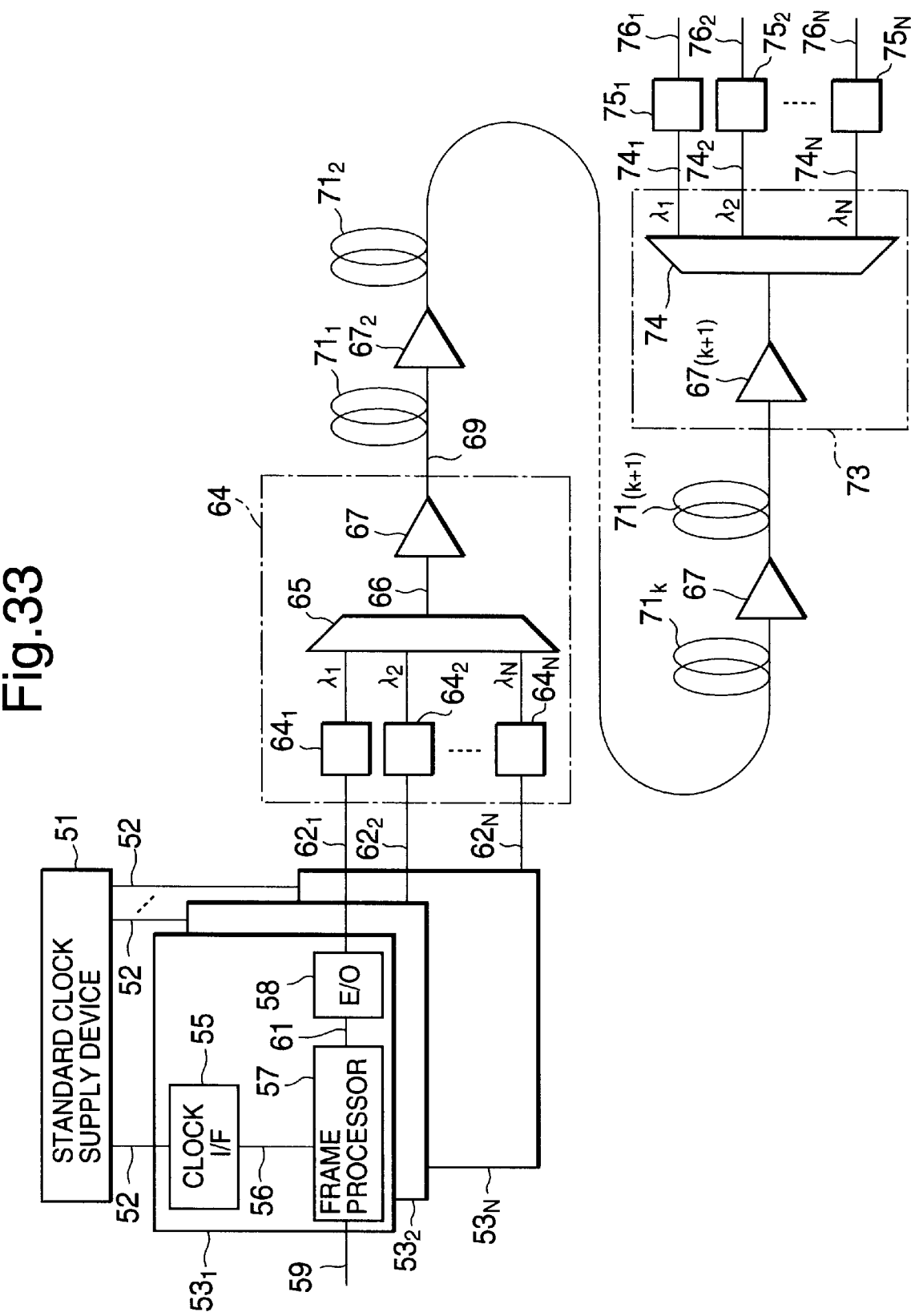
FIG. 33 is a block diagram showing the optical transmission system used in the related art to eliminate the non-linear optical effect.
Figure 34:
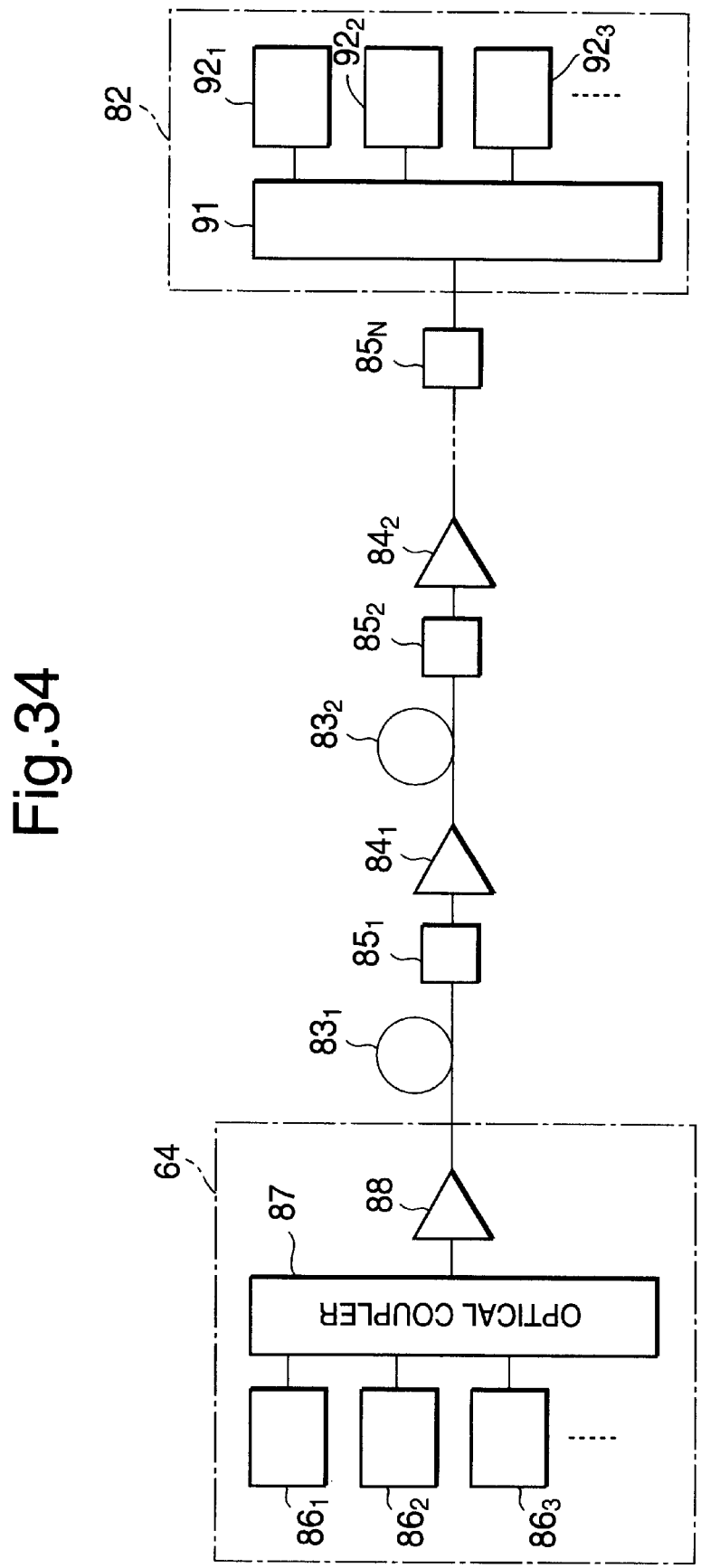
FIG. 34 is a drawing showing the overall structure of the optical transmission system disclosed in Japanese Patent Laid-open 7-66779.
Figure 36A:
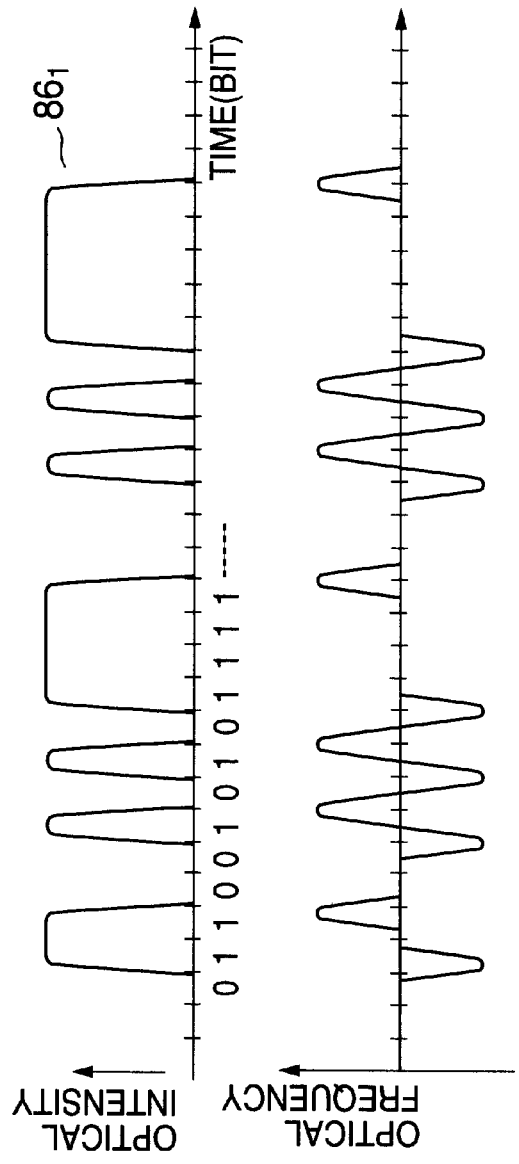
FIGS. 36(a) to 36(d) are various waveform diagrams showing the signal processing in the optical transmission system of FIG. 34.
Figure 36B:
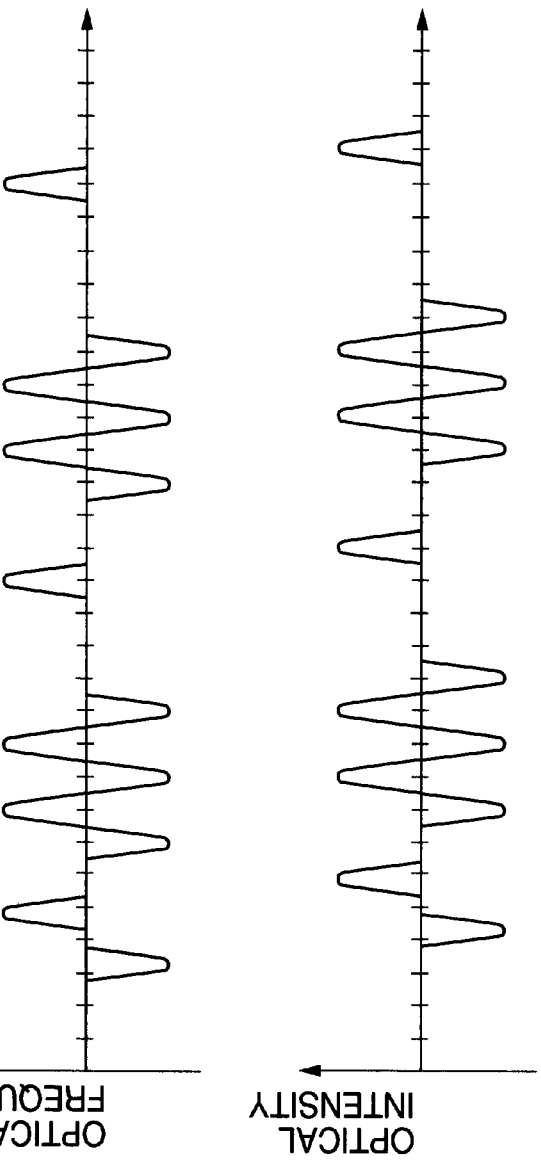
Figure 36C:
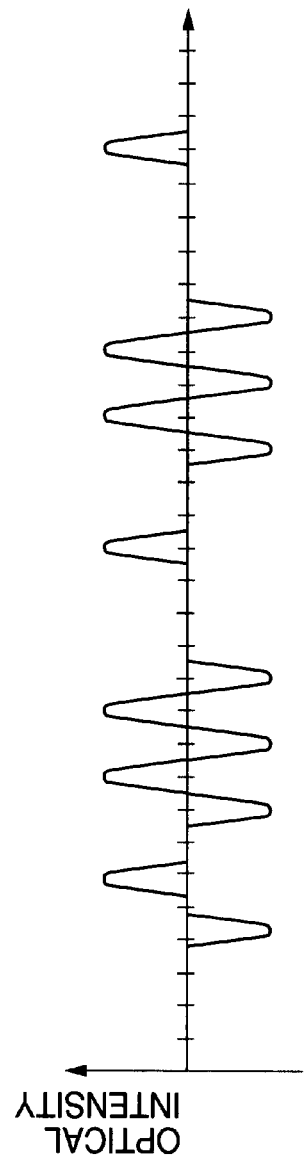
Figure 36D:
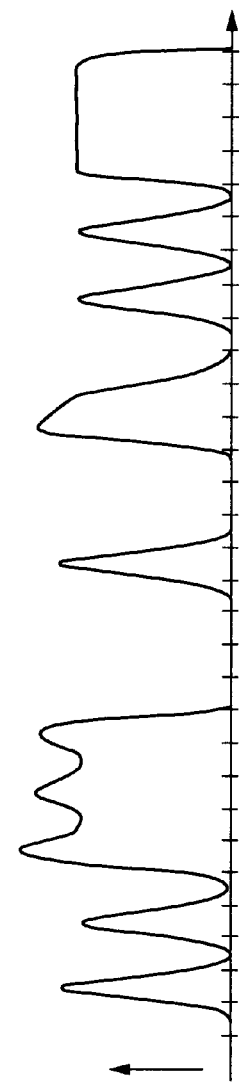

FIG. 28 is a block diagram showing a variation of the optical interface with overhead information monitor used in the second embodiment. Sections in FIG. 28 identical to FIG. 13 have the same reference numerals and their description is omitted. In an overhead information monitor optical interface 602 of this variation, an overhead termination circuit 002 is installed between the optical/electrical (O/E) converter 211 and the electrical/optical converter (E/O) 212.

By providing an overhead termination function by means of an overhead termination circuit 602 between the optical/electrical (O/E) converter 211 and electrical/optical converter (E/O) 212, section overheads such as for SDH (synchronous digital hierarchy) or SONET (synchronous optical network) can be terminated and monitor information 603 for the overheads can be output.

The embodiment as shown in FIG. 4, described a continuous signal configuration without gaps between frames however, if overheads can be set appropriately in a signal configuration having time intervals present in each frame, then a signal configuration with time intervals in each frame is also applicable to this invention.

According to first aspect of the invention as described above, deterioration from the non-linear optical effect on overheads of fixed patterns due to time overlaps among overheads in optical signals sent from a plurality of transmit side optical transmission devices, can be canceled out by phase adjustment on each transmit side optical transmission device, rendering the effect that the transmission quality of the overhead portion of the optical signal can be effectively enhanced without requiring a special feedback system.

According to second aspect of the invention as described above, a discrimination means can determine time offsets or deviations in the overhead of optical signals sent from a plurality of transmit side optical transmission devices, and according to these discrimination results can set a delay in the optical signal sent from the transmit side optical transmission devices so that the phase of the overheads will be mutually offset. Feedback control is thus performed in this way so that even if a completely new transmit side transmission device is installed, or electrical characteristics of the current transmit side transmission device change, the offsets in overhead of optical signals output will still always be correctly set from now on rendering the effect that the non-linear optical effect can be alleviated.

According to third aspect of the invention as described above, the phase of each overhead is adjusted with feedback control the same as in second aspect of this invention so that even if a completely new transmit side transmission device is installed, or electrical characteristics of the current transmit side transmission device change, a correct offset can always be set in the overhead of optical signals that are output so that the non-linear optical effect can be alleviated. Further, unlike the second aspect of the invention, a beneficial effect is rendered in that the circuit design can be simplified since there is no need to set the delay on the transmit side optical transmission device end.

According to fourth aspect of the invention as described above, time offsets in overheads in the optical signals sent from a plurality of transmit side optical transmission devices are discriminated, and a switching means is controlled to select the dispersion optical fiber having the optimum effect in reducing these time offsets in wavelengths, so that overheads can be placed as needed without using a special delay means is not required rendering the effect that the non-linear optical effect can be alleviated.

What is claimed is:

1. An optical transmission system having a plurality of transmit side optical transmission devices to make respective unique frames having the same frame period based on identical standard clocks, add an overhead of specified length to the beginning of these frames and send as respectively different optical signals, a wavelength-division multiplexing signal transmission means to perform wavelength-division multiplexing of optical signals of different wavelengths sent from said plurality of transmit side optical transmission devices, and send to a device on the receive side by way of the transmission path, an overhead phase alignment means to store beforehand the time offsets of the frames generated using said standard clocks at said plurality of transmit side optical transmission devices, and set the amount of time delay for optical signals output from said plurality of transmit side optical transmission devices so that the overheads at each of these transmit side optical transmission devices are mutually wavelength multiplexed with a time offset.

2. An optical transmission system of claim 1, where said overhead phase alignment means aligns the phase of the overhead using an overhead time offset by selecting one optical fiber from the optical fibers of respectively different lengths.

3. An optical transmission system of claim 1, where said overhead phase alignment means aligns the phase of the overhead using an overhead time offset by selecting one delay device from a plurality of delay devices to delay electrical signal having different delay times.

4. An optical transmission system having a plurality of transmit side optical transmission devices to make respective unique frames based on identical standard clocks, add an overhead of specified length to the beginning of these frames and send them as respectively different optical signals,

- a phase detection means to detect the time offsets of overheads in the optical signals sent from the plurality of transmit side optical transmission devices,
- an overhead phase alignment means to set the amount of time delay for optical signals output from said plurality of transmit side optical transmission devices based on results from said discrimination means, so that the overheads at each of these transmit side optical transmission devices are mutually wavelength multiplexed with a time offset,
- and a wavelength-division multiplexing means to receive the optical signals with delays adjusted by the overhead phase alignment means from the plurality of transmit side optical transmission devices, and perform wavelength division multiplexing of the signals of different wavelengths, and send along a transmission path to a receive side device.

5. An optical transmission system having a plurality of transmit side optical transmission devices to make respective unique frames based on identical standard clocks, add an overhead of specified length to the beginning of these frames and send them as respectively different optical signals,

- a phase detection means to detect the time offsets of overheads in the optical signals sent from the plurality of transmit side optical transmission devices,
- an overhead phase alignment means to set the amount of time delay for optical signals based on results from said phase detection means, so that the overheads at each of optical signals are mutually wavelength multiplexed with a time offset,
- and a wavelength-division multiplexing means to perform wavelength division multiplexing of the optical signals with delays adjusted by the overhead phase alignment means and send along a transmission path to a receive side device.

6. An optical transmission system having a plurality of transmit side optical transmission devices to make respective unique frames based on identical standard clocks, add an overhead of specified length to the beginning of these frames and send them as respectively different optical signals,

- a phase detection means to detect the time offsets of overheads in the optical signals sent from the plurality of transmit side optical transmission devices,
- a wavelength-division multiplexing means to perform wavelength division multiplexing of the optical signals from said phase detection means,
- a selectable phase dispersion means to select a desired dispersion fiber from a plurality of dispersion fibers of different dispersion values for differing wavelengths, and
- a selection means to select a dispersion fiber having the most effect in reducing the non-linear optical effect in optical signals which is launched into transmission fiber as wavelength multiplexed signals.

* * * * *